(12) United States Patent
Cao et al.

(10) Patent No.: US 6,463,341 B1
(45) Date of Patent: Oct. 8, 2002

(54) ORTHOGONAL FUNCTIONAL BASIS METHOD FOR FUNCTION APPROXIMATION

(75) Inventors: Yang Cao, Bradford, MA (US); Steven R. LeClair, Spring Valley; Chun-Lung Philip Chen, Beavercreek, both of OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/326,441

(22) Filed: Jun. 4, 1999

Related U.S. Application Data

(60) Provisional application No. 60/087,965, filed on Jun. 4, 1998.

(51) Int. Cl.$^7$ ............................................. G05B 13/02
(52) U.S. Cl. ............................. 700/48; 700/47; 706/17
(58) Field of Search ...................... 700/47, 48; 706/17, 706/29

(56) References Cited

U.S. PATENT DOCUMENTS 5,796,924 A  *  8/1998  Errico et al. .................. 395/23

* cited by examiner

*Primary Examiner*—Paul P. Gordon
(74) *Attorney, Agent, or Firm*—Fredric L. Sinder; Thomas L. Kundert

(57) ABSTRACT

An orthogonal functional basis method for function approximation is disclosed. Starting with the orthogonal least squares method, a new subset selection method for selecting a set of appropriate basis functions is explained where, instead of picking a subset from a given functional basis, the subset is selected from a combination of functional basis evolved from a set of heterogeneous basis functions. The method results in a more efficient neural network.

2 Claims, 16 Drawing Sheets

ORTHOGONAL FUNCTIONAL BASIS METHOD FOR FUNCTION APPROXIMATION

CROSS-REFERENCE TO RELATED APPLICATIONS

This application claims priority under 35 U.S.C. §119(e) from U.S. provisional application No. 60/087,965, filed Jun. 4, 1998, by applicants Yang Cao, Steven R. LeClair and Chun-Lung Philip Chen, entitled Orthogonal Functional Basis Method for Function Approximation. The invention description contained in that provisional application is incorporated by reference into this description.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to function approximation or regression analysis, the process of deriving from empirical data a function, or a series of summed functions, which reasonably describes the real process creating the empirical data, and more specifically to an improved orthogonal least squares (OLS) method for mapping or relating variables that can distinguish signal from noise.

Controlling physical processes frequently requires a method for experimentally determining, or approximating, functions or equations which describe the physical process, particularly for complex processes where theoretical descriptions of the process are difficult to derive.

To learn a function from empirical data, a method of mapping or relating variables which is capable of distinguishing signal from noise is necessary. A number of statistical and neural network methods are used to regress empirical data. Unfortunately, all such methods are not able to successfully distinguish signal from noise.

Traditional methods for function approximation or regression involve a linear combination of the product of single variable or fixed basis functions (e.g., polynomial, spline, and/or trigonometric expansions). As described in Barron, A. R., and Xiao, X., 1991, Discussion of "Multivariable adaptive regression splines" by J. H. Friedman. *Ann. Stat.* 19, pp. 67–82, the problem with traditional methods is that there are exponentially many orthonormal functions but unless all of these orthonormal functions are used in the fixed basis, there will remain functions that are not well approximated, i.e., the order of the squared approximation error is $1/n^{(2/d)}$, where n is the number of basis functions and d is the number of input variables. This problem is avoided by tuning or adapting the parameters of multi-variable basis functions to fit the target function as in the case of neural networks, wherein the order of the squared approximation error is $1/n$.

The biological origins of neural networks, as chronicled in Pao, Y. H., 1996, "Memory based computational intelligence for materials processing and design," Wright Laboratory Technical Report WL-TR-96-4062, Wright-Patterson AFB, OH, pp. 1–14, established the multi-variable sigmoid as "the" basis function for neural networks. Today the suite of multi-variable basis functions employed in neural networks is without bound, but the most commonly used are the sigmoid and radial basis functions. Radial basis function neural networks typically employ subset selection to identify a set of Gaussian basis functions. Broomhead, D. S., and Lowe, D., 1988, *Multivariable functional interpolation and adaptive methods.* Complex Syst. 2, pp. 321–355, have tried to choose such a subset randomly from the entire given set. In lieu of random selection, Rawlings, J. O., 1988, *Applied Regression Analysis,* Wadsworth & Brooks/Cole, Pacific Grove, Calif., has proposed a systematic approach that employs forward selection to choose the subset that best explains the variation in the dependent variable incrementally. Based on this concept, Chen, S., Cowan, C. F. N. and Grant, P. M., 1991, "Orthogonal least squares learning algorithm for radial function networks," *IEEE Trans. on Neural Networks,* Vol. 2, No.2, pp. 302–309, presented an efficient implementation of forward selection using the orthogonal least square method (OLS). Subset selection can also be used to avoid overfitting by limiting the complexity of the network. From the literature, overfitting may be avoided when combining subset selection with other methods such as regularization in Barron, A. R., and Xiao, X., 1991, Discussion of "Multivariable adaptive regression splines" by J. H. Friedman. *Ann. Stat.* 19, pp. 67–82; in Breiman, L., 1992, *Stacked Regression,* Tech. Rep. TR-367, Department of Statistics, University of California, Berkeley; and, as contributed by Mark Orr, combining OLS and regularization, in Orr, M. J. L., 1995, "Regularization in the Selection of Radial Basis Function Centers," *Neural Computation,* 7, pp. 606–623.

Unfortunately, as described in the Detailed Description, the traditional approach of subset selection is insufficient, requiring computational complexity and slower than desired convergence.

Thus it is seen that there is a need for improved methods of subset selection as part of the orthogonal least squares (OLS) method for function approximation.

It is, therefore, a principal object of the present invention to provide an improved OLS method for training neural networks.

It is a feature of the present invention that it provides increased computational tractiveness over prior art methods.

It is another feature of the present invention that it provides faster convergence than prior art methods.

It is an advantage of the present invention that it provides more accurate function approximations than prior art methods.

These and other objects, features and advantages of the present invention will become apparent as the description of certain representative embodiments proceeds.

SUMMARY OF THE INVENTION

In accordance with the foregoing principles and objects of the present invention, a new method for using the Orthogonal Least Squares method for training neural networks is described. Instead of selecting a subset of orthogonal basis from a selected subset of given regressors, the method of the present invention finds the subset of orthogonal basis from an orthogonal combination of the given regressor set. The benefit of this approach is that it avoids discarding useful information and excessive weight enlargement in linear links of a neural network.

With a unique transformation of the basis functions used to affect a mapping of variables, a functional mapping is now achievable. A functional mapping means that the dependent variable(s) can be explained in terms of the independent variables only. Any additional variables and/or environmental noise which contribute to the dependent variable values are not explained by this mapping because of the unique transformation of the basis functions.

Accordingly, the present invention is directed to a method for choosing a set of orthogonal basis functions for a function approximation from empirical data described as $$\{x_t, y_t\}_{t=1}^P,$$

comprising the steps of constructing a heterogeneous regressor set $$F = \{f_i\}_{i=1}^N$$

from a set of randomly selected basis functions, defining $\Psi$ as $\Psi = [\phi_1, \phi_2, \ldots, \phi_N]$=rearrangement (F) by at a first step k=1, denoting a first column of the $\Psi$ matrix, $\phi_1 \equiv f_t^{(1)}$, selected from $f_i^{(1)}$ where $$\|f_t^{(1)}\|^2 = \max\left\{\|f_i^{(1)}\|^2 \Big|_{i=1}^N\right\}$$

and the first orthogonal basis is $$h_1 = \sum_{i=1}^N \frac{\langle f_t^{(1)}, f_i^{(1)} \rangle}{\|f_t^{(1)}\|^2} f_t^{(1)},$$

building an orthogonal basis matrix H by at a kth step, where $k \geq 2$, calculate $f_i^{(k)}$ and $h_k$ as $$f_i^{(k)} = f_i^{(k-1)} \frac{\langle f_i^{(k-1)}, f_t^{(k-1)} \rangle}{\|f_t^{(k-1)}\|^2} f_t^{(k-1)},$$

$$h_k = \sum_{i=1}^N \frac{\langle f_t^{(k)}, f_i^{(k)} \rangle}{\|f_t^{(k)}\|^2} f_t^{(k)},$$

such that $h_k$ can be simplified as $$h_k = \sum_{m=1}^N \frac{\left\langle \left(\varphi_k - \sum_{i=1}^{k-1} \frac{\langle \varphi_k, \varphi_i \rangle}{\|\varphi_i\|^2} \varphi_i\right), \varphi_m \right\rangle}{\left\|\varphi_k - \sum_{i=1}^{k-1} \frac{\langle \varphi_k, \varphi_i \rangle}{\|\varphi_i\|^2} \varphi_i\right\|^2} \left(\varphi_k - \sum_{i=1}^{k-1} \frac{\langle \varphi_k, \varphi_i \rangle}{\|\varphi_i\|^2} \varphi_i\right), \text{ where}$$

$$\phi_k \equiv f_t^{(k)},$$

initializing by letting $H_{subset} = \phi$, where $\phi$ is an empty set and let k=1,
finding $h_i$ such that $$\max_i \left\{ \frac{(y^T h_i)^2}{\lambda + (h_i)^T h_i} \right\}, \text{ and}$$

including $h_i$ as an element of the $H_{subset}$ such that $$H_{subset} = H_{subset} \cup h_i,$$

regularizing by modifying the generalized cross validation variable $\lambda$ by letting the index of selected $f_t^{(k)}$ in the original F matrix be j, where $$\left(\|f_t^{(k)}\|^2 = \max\{\|f_i^{(k)}\|^2\}_{i=1}^N\right), \text{ such that } \varphi_k = f_j^{(1)}, \text{ and}$$

stopping if $\|f_t^{(k)}\|^2 \leq \epsilon$, where $\epsilon$ is a preselected minimum value, otherwise letting k=k+1 and repeating beginning at step (e).

The present invention is also directed to a method for controlling a physical process, comprising the steps of obtaining a set of empirical data from the physical process, determining a function approximation of the physical process from the empirical data by the just described method, and using the determined function approximation to choose process parameters for obtaining preselected physical results from the physical process.

BRIEF DESCRIPTION OF THE DRAWINGS

The present invention will be more clearly understood from a reading of the following detailed description in conjunction with the accompanying drawings wherein.

DETAILED DESCRIPTION

Brief Description

Figure 1:
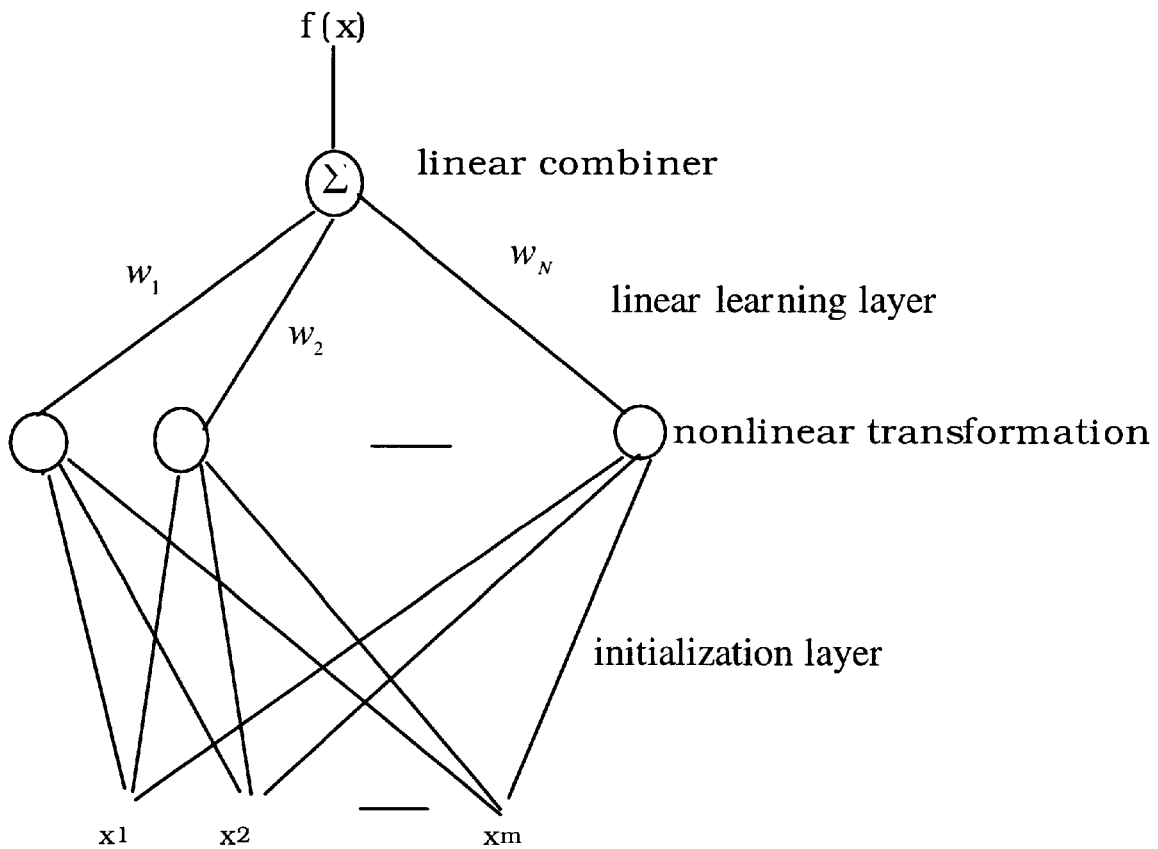
FIG. 1 shows an example one-hidden layer neural network.

The following description includes a detailed review of neural nets and a detailed description of the operation of the present invention. This brief description serves as an introduction to the more detailed description.

The Orthogonal Least Squares (OLS) approach to the training of neural networks was original developed by S. Chen et al. for radial function networks. It is described in Chen, S., Cowan, C. F. N. and Grant, P. M., 1991, "Orthogonal least squares learning algorithm for radial function networks," *IEEE Trans. on Neural Networks*, Vol.2, No.2, pp.302–309. It is a basis function (functional-link) approach for which the discrete instantations of the basis functions are orthogonalised with respect to each other. This leads to computational simplifications, but raises issues of how the initial basis functions are to be chosen, which functions should be involved in forming the orthogonal basis vectors and whether regularization is needed or effective. Orr, as described in Orr, M. J. L., 1995, "Regularization in the Selection of Radial Basis Function Centers", *Neural Computation.*, 7, pp. 606–623, found that regularization and cross validation seemed to improve results, although at the price of increased computational complexity.

The present invention arises from recognizing a subtle point when examining the use of OLS with regularization. This seemingly minor point leads to significant consequences and results, in the present invention, to formulated means for strengthening the original OLS procedure, if and when it is practiced with regularization.

Briefly, in forming the orthogonal vectors which are the basis for representation of the pattern vectors, one uses some method such as the Gram-Schmidt procedure. The primary concern is that the vectors so obtained be orthogonal to each other. The norms are noted, but are of no explicit concern because they are employed at appropriate junctures in subsequent computations. This can inadvertently lead to undesirable results in the regularized OLS. This is because when the orthogonalised norms are small, the weights in the linear links of the final layer tend to be large and this is at odds with the regularization term in the enhanced objective function. The present invention is build on the unique discovery that if the norms are conserved in the orthogonalization procedure, the resulting net architecture is consistently less complex and the convergence is consistently more rapid.

The present invention introduces a new subset selection method as explained via the principle of regularization. Instead of picking the subset from the given functional basis, the subset is selected from a combination of functional basis evolved from a set of heterogeneous basis functions. Using this approach, all the information provided in the given data set is fully utilized and a more efficient neural network architecture, the Orthogonal Functional Basis Neural Network (OFBNN) is obtained. For generalization purposes, the well-known delete-1 (described in Allen, D. M., 1974, "The relationship between variable selection and data augmentation and a method from prediction," Technometrics, Vol. 16, No. 1, pp. 125–127) and generalized cross validation (GCV) (described in Golub, G. H., Heath, M., and Wahba, G., 1979, "Generalized cross-validation as a method for choosing a good ridge parameter," *Technometrics* 21 (2), pp. 215–223) methods have been utilized in neural network training.

This description briefly reviews previous approaches based on the one-hidden layer function network structure including subset selection and regularization. The Orthogonal Least Squares (OLS) method proposed by Chen (described in Broomhead, D. S., and Lowe, D., 1988, *Multivariable functional interpolation and adaptive methods.* Complex Syst. 2, pp. 321–355) is reviewed. The description then distinguishes the traditional viewpoint in subset selection and the principle of regularization. The proposed OFBNN and the learning procedures are then presented in detail. Some simulation results are then described and discussed, followed by conclusions.

Neural Net Review

A schematic of a one-hidden layer function network is depicted in FIG. 1. Each node in the hidden layer is a fixed non-linear function $f_j(x)$ with input $x \in R^m$ and for simplicity the output is assumed to be scalar. The final result is the linear combination of these non-linear functions:

$$y = f(x) = \sum_{j=1}^{N} w_j f_j(x) \tag{1}$$

with only the linear coefficients $\{w_j\}_1^N$ being unknown.

As proved by Park and Sandberg, in Park, J., and Sandberg, I. W., 1991, "Universal approximation using and radial-basis-function networks," *Neural Computation*, Vol. 3, No.2, pp. 246–257, and further by Igelnik and Pao, in Igelnik, Boris and Pao, Yoh-Han, 1995, "Stochastic Choices of Basis Functions in Adaptive Approximation and the Functional-Link Net", *IEEE Trans. on Neural Networks*, Vol. 6, No.6, pp. 1320–1328, the above network structure is a universal approximator for continuous functions on bounded finite dimensional sets. As shown by Igelnik and Pao, the choice of nonlinearity $f_j(\cdot)$ is not crucial and $f_j(\cdot)$ can take either of the following forms:

(1) $f_j(x) = \sigma(q \cdot x + b)$ where $q \in R^n, x \in R^n, b \in R$, $\sigma$ was proved to be of the general choice (see Breiman).

(2) $f_j(x) = \sigma(\theta \cdot [x-c]^T [x-c])$ where $\theta \in R, x \in R^n, c \in R^n$ The first equation is consistent with the general form of the Functional-Link (FL) neural network and the second equation corresponds to the Radial-Basis Function (RBF) neural network. Their respective proofs provide the foundation for the functional mapping, $f: R^n \to R$, between a set of training patterns $x = [x_1, \ldots, x_P]^T$, and the corresponding output, $y = [y_1, y_2, \ldots, y_P]^T$ with $y_i = f(x_i) i = 1, 2, \ldots, P$ using the single layer neural network structure.

One approach for selecting RBF centers is subset selection, in which a possible subset is chosen to form the regressors from a given regressor set. This method has the advantage of producing an efficacious network (see Rawlings, J. O., 1988, *Applied Regression Analysis.*, Wadsworth & Brooks/Cole, Pacific Grove, Calif.; and, Broomhead, D. S., and Lowe, D., 1988, *Multivariable functional interpolation and adaptive methods.* Complex Syst. 2, pp. 321–355). Broomhead and Lowe have suggested that one can choose such a subset randomly from the initially given set. A better approach is that suggested by Rawlings to choose the subset that best explains the variation in the dependent variable.

With data sets from noisy environments, functional mapping is expressed as, $y_i=f(x_i)+\epsilon_i$, where $\epsilon_i$ represents the error and is assumed to be uncorrelated with $f(x_i)$. From the literature, the general approach to mapping noisy data sets is the regularization approach suggested by Tikhonov and Arsenin. As pointed out by Mackay in Mackay, D. J. C., 1992. Bayesian interpolation. *Neural Computation*, 4 (3), pp. 415–447, this approach reduces the "number of good parameter measurements" by adding one weight penalty term in the objective function. For example, the zero-order regularization (described in Press, W. H., Teukolsky, S. A., Vetterling, W. T., and Flattery, B. P., 1992, *Numerical Recipes in C*, 2nd ed. Cambridge University Press, Cambridge, UK) is to minimize the following objective function:

$$E=e^Te+\lambda g^Tg \qquad (2)$$

where $e=y-f(X)$ and g is the linear weight vectors. In general, regularization results in small weights in the final 'smoothed' functional form. The regularized orthogonal least squares (ROLS) proposed by S. Chen et al. combines subset selection, forward selection (Rawlings), OLS (S. Chen), and regularization to generate a more efficient network structure. Mark Orr further enhanced OLS and reported on the benefits of regularization involving the selection of RBFs.

Orthogonal Least Squares (OLS)

OLS can be viewed as a more efficient implementation of forward selection in the context of subset selection. The following is a brief overview of the implementation of OLS. The detailed procedure is described in Chen, S., Cowan, C. F. N. and Grant, P. M., 1991, "Orthogonal least squares learning algorithm for radial function networks," *IEEE Trans. on Neural Networks*, Vol.2, No.2, pp.302–309.

Given P input-output training pairs:

$$\{x_t, y_t\}_{t=1}^P.$$

. Each input pattern vector $x_t$ can be expressed as $[x_{t1}, \ldots, x_{tm}]^T$. Also given is a set of N non-linear functions $$\{f_i\}_{i=1}^N.$$

. Each $f_i$ could be viewed as one specific non-linear regressor. Together they comprise the regression matrix F with P*N elements. The ith column of the regression matrix F is associated with the nonlinear function $f_i$, i.e., $$f_i=[f_i(x_1),\ldots,f_i(x_P)]^T \qquad (3)$$

Assume $q_i$ is the linear parameter for $f_i$, $$q=[q_1,\ldots,q_N]^T \qquad (4)$$

The mapping can be described as:

$$y=Fq+e \qquad (5)$$

where $$y=[y_1,\ldots,y_P]^T$$

$$e=[\epsilon_1,\ldots,\epsilon_P]^T \qquad (6)$$

The Gram-Schmidt algorithm performs an orthogonal decomposition for F such that $F=H^{OLS} A$, where $H^{OLS}$ is an orthogonal matrix and A is an M*M upper-triangular matrix with unity diagonal elements, as shown below:

$$A = \begin{bmatrix} 1 & a_{12} & a_{13} & \cdots & a_{1N} \\ 0 & 1 & a_{23} & \cdots & a_{2N} \\ 0 & 0 & \ddots & \ddots & \vdots \\ \vdots & \vdots & \ddots & 1 & a_{N-1N} \\ 0 & \cdots & 0 & 0 & 1 \end{bmatrix} \qquad (7)$$

With the above transformation, Eq. (5) can be rewritten as the following:

$$y=Fq+e=H^{OLS}Aq+e=H^{OLS}g+e \qquad (8)$$

where $$g=Aq \qquad (9)$$

From Eq. (9), it is seen that:

$$e=y-H^{OLS}g \qquad (10)$$

Taking the derivative of $e^Te$ with respect to g, one gets:

$$g=((H^{OLS})^T H^{OLS})^{-1}(H^{OLS})^T y \qquad (11)$$

or each element of g can be expressed as:

$$g_i = \frac{(h_i^{OLS})^T y}{(h_i^{OLS})^T h_i^{OLS}}, \quad i=1,2,\ldots,P \qquad (12)$$

Once g is found, solving Eq. (10) for q, i.e., $q=A^{-1}g$, gives a final result of $$\sum_{j=1}^P g_j f_j(x).$$

In the interest of computational tractiveness and speed, the most significant subset of the given regressors needs to be selected. The selection criteria is typically based on the following equation. From Eq. (11), it is known that:

$$e^Te=y^Ty-2(y-H^{OLS}g)^T H^{OLS}g - g^T(H^{OLS})^T H^{OLS}g \qquad (13)$$

Since $(y-H^{OLS}g)^T H^{OLS}g=0$, one has $$e^Te = y^Ty - g^T(H^{OLS})^T H^{OLS}g \qquad (14)$$

$$= y^Ty - \sum_{i=1}^N g_i^2 (h_i^{OLS})^T h_i^{OLS}$$

$$\frac{e^Te}{y^Ty} = 1 - \sum_{i=1}^N \frac{g_i^2 (h_i^{OLS})^T h_i^{OLS}}{y^Ty}$$

In this way, the contribution made by each orthogonal basis could be expressed as:

$$contribution_i = \frac{g_i^2 (h_i^{OLS})^T h_i^{OLS}}{y^Ty} \qquad (15)$$

The subset of the most significant regressors is typically selected based on the above criterion. During the selection process, each orthogonal basis $h_i^{OLS}$ is obtained in the following way.

The computational procedure is represented as:

$$h_1^{OLS} = f_1$$

$$a_{ik} = \frac{(h_i^{OLS})^T f_k}{(h_i^{OLS})^T h_i^{OLS}}, \quad 1 \leq i \leq k \quad (16)$$

$$h_k^{OLS} = f_k - \sum_{i=1}^{k-1} a_{ik} h_i^{OLS}$$

By combining OLS and forward selection, the regressors can be selected as described in Chen, Cowan and Grant. However, if too many regressors are used in the functional mapping, the network will become overly sensitive to the training data which often results in poor generalization. To avoid this situation, zero-order regularization as shown in Eq. (2) can be employed. The regularized orthogonal least squares (ROLS) proposed by S. Chen et al. in Chen, S., Chng, E. S., and Alkadhimi, K., 1995, "Regularized orthogonal least squares algorithm for constructing radial basis function networks," *International Journal of Control*, submitted, and regularization of RBF centers proposed by Orr in Orr, M. J. L., 1995, "Regularization in the Selection of Radial Basis Function Centers", *Neural Computation.*, 7, pp. 606–623, attempted to solve this problem. As pointed out by S. Chen, in the case of a regularized network in which $\lambda > 0$, the orthogonalization is possible only if the roughness penalty depends on the orthogonalized weights, not the ordinary weights. The OLS algorithm has been shown to be an effective selection method and has been fundamental in the implementation of forward selection for both ROLS (S. Chen et al.) and regularization involving RBF centers (Orr). In the next section, the nature of OLS in the selection of orthogonal basis functions is discussed and, more specifically, the problem of forward selection using the OLS method.

Insufficiency of Forward Selection Using the OLS Method

Without loss of generality, assume that there exists a functional mapping, $f$, that maps a set of training patterns, $x$, to $y$, i.e., $$y_i = f(x_i)|_{i=1}^P \quad (17)$$

in which one assumes that $e=0$. And also suppose there exists two functional basis $f_1$ and $f_2$ such that:

$$f = f_1 + f_2 \quad (18)$$

Figure 2:
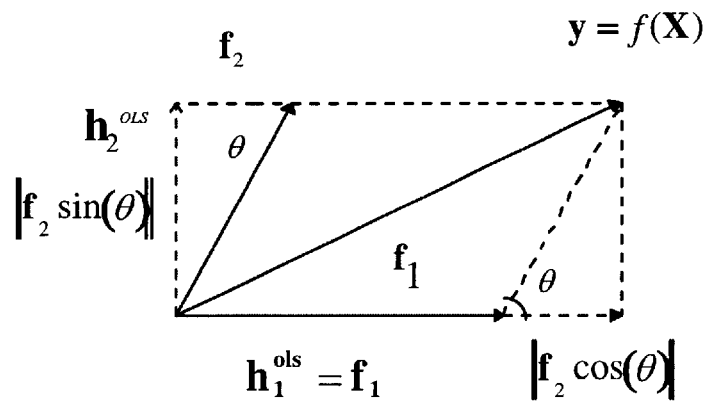
FIG. 2 shows an orthogonal decomposition of a functional basis.

Given the regression set F, which consists of only two regressors $f_1$ and $f_2$, and $f = f_1 + f_2$ where $f = [f(x_1), f(x_2), \ldots, f(x_P)]^T$ and $f_i = [f_i(x_1), f_i(x_2), \ldots, f_i(x_P)]^T$, $i=1, 2$. The functional mapping is depicted geometrically in FIG. 2.

In accordance with the OLS procedure and Eq. (16), $f_1$ is selected and the first orthogonal basis, $h_1^{OLS}$, is defined in the following way:

$$h_1^{OLS} = f_1 \quad (19)$$

The second orthogonal basis $h_2^{OLS}$ can be obtained from the component of $f_2$ which is orthogonal to $h_1^{OLS}$. Mathematically speaking:

$$h_2^{OLS} = f_2 - \frac{\langle f_2, f_1 \rangle}{\|f_1\|} f_1 \quad (20)$$

where $\langle \bullet, \bullet \rangle$ is the inner product operator.

It is known that $$\theta = \cos^{-1}\left(\frac{\langle f_1, f_2 \rangle}{\|f_1\| \|f_2\|}\right) \quad (21)$$

thus $$h_2^{OLS} = f_2 \sin(\theta) \quad (22)$$

An interesting result of the OLS method is the square norm of the output:

$$\|y\|^2 = \|f\|^2 = \|(\|f_1\| + \|f_2 \cos(\theta)\|)\|^2 + \|f_2 \sin(\theta)\|^2 > \|f_1\|^2 + \|f_2 \sin(\theta)\|^2 \quad (23)$$

that is $$\|y\|^2 > \|h_1^{OLS}\|^2 + \|h_2^{OLS}\|^2$$

This result is key to the new method discussed below and is shown here to describe desirable characteristics of forward selection methods. Eq. (23) indicates that although the initial regressor set $f_1$ and $f_2$ are given in Eq. (18), the final function f cannot be constructed from just two forward selected orthogonal basis $h_1^{OLS}$ and $h_2^{OLS}$. It has also been shown in Eqs. (17) and (18) that to reconstruct y, forward selection via the OLS algorithm enlarges the linear weight (in this case, $g_1$) that corresponds to the orthogonal basis ($h_1^{OLS}$) to compensate for the discarding of $|f_2 \cos(\theta)|$ as a consequent of the inner product with $h_2^{OLS}$. The ratio of the enlargement by the OLS is shown below.

$$g_1 = \frac{\langle y, h_1^{OLS} \rangle}{(h_1^{OLS})^T h_1^{OLS}} = \frac{\|y \cos(\theta)\|}{\|h_1^{OLS}\|} = \frac{\|f_1\| + \|f_2 \cos(\theta)\|}{\|f_1\|} = 1 + \frac{\|f_2 \cos(\theta)\|}{\|f_1\|} \quad (24)$$

As shown in Eq. (2), relative to the method of regularization, weight enlargement to ensure orthogonality is undesirable because of an additional penalty term (i.e., $\lambda g^T g$) employed in the objective function to avoid huge weight values in the network. This comparison of the OLS procedure for forward selection and regularization reveals an incongruity, i.e., the discarding of useful information, $\|f_2 \cos(\theta)\|$, by the OLS algorithm.

The basic problem of traditional subset selection is the procedure, wherein the subset is first selected from the given regressor set, and then the orthogonal basis set is constructed from the projection (inner product) of the existing regressors. Instead of selecting the subset of orthogonal basis from a selected subset of the given regressors, the approach of the present invention finds the subset of orthogonal basis from an orthogonal combination of the given regressor set. The benefit of this approach is that it avoids discarding useful information, $\|f_2 \cos(\theta)\|$, and the excessive weight enlargement, $g_i$, as illustrated above.

To ensure the benefit of the method of the present invention, each basis is selected from the orthogonal combination of the given regressors. In addition, as opposed to the OLS algorithm, two orthogonal basis are obtained in the following way.

$$h_1 = f_1 + \frac{\langle f_2, f_1 \rangle}{\|f_1\|^2} f_1 \quad h_2 = f_2 - \frac{\langle f_2, f_1 \rangle}{\|f_1\|^2} f_1 \quad (25)$$

Wherein, the norm of each orthogonal basis is, $$\|h_1\| = \|f_1\| + \|f_2 \cos(\theta)\|$$

$$\|h_2\| = \|f_2 \sin(\theta)\| \quad (26)$$

and the squared norm of the function is $$\|y\|^2 = \|f\|^2 \quad (27)$$
$$= \|f_1\|^2 + \|f_2\|^2 + 2*\|f_1\|\|f_2\|\cos(\theta)$$
$$= \|f_1\|^2 + \|f_2\|^2\sin^2(\theta) + \|f_2\|^2\cos^2(\theta) + 2*\|f_1\|\|f_2\|\cos(\theta)$$
$$= \|f_2\|^2\sin^2(\theta) + \|f_1\|^2 + 2*\|f_1\|\|f_2\|\cos(\theta) + \|f_2\|^2\cos^2(\theta)$$
$$= \|f_2\|^2\sin^2(\theta) + (\|f_1\| + \|f_2\|\cos(\theta))^2$$
$$= \|h_1\|^2 + \|h_2\|^2$$

The above equation shows that the squared norm of the function is the same as the sum of squares of the norm of each orthogonal basis. It also tells us that the energy of y can be reconstructed from the energy of two new orthogonal basis. Unlike the OLS approach, as shown in Eq. (23), the energy of $h_1^{OLS}$ and $h_2^{OLS}$ is less than the energy of y. With this new orthogonal basis, there is not a need to enlarge the weights (i.e., g). In the next section this approach is expanded with a system that has more than two basis, and basis selection is summarized by a simple transformation, *Orthogonal Function Transformation*, (OFT). A new neural network architecture, *Orthogonal Functional Basis Neural Network* (OFBNN) is introduced based on this transformation.

Net Architecture Development

Based on the above discussed approach, k orthogonal basis functions, $h_1, h_2, \ldots, h_k$, are constructed from the original F set, where k is the rank of F. Each orthogonal basis, $h_i$, is a linear combination of orthogonal components of each member in the given set F. Based on this decomposition, a new neural network structure, OFBNN, is proposed. The speed of convergence of the new basis in the OFBNN is proved to be superior to the regularization process.

The OFT can be obtained by rearranging the columns of the $F=[f_1^{(1)}, f_2^{(1)}, \ldots, f_N^{(1)}]$ matrix through an iterative procedure, where the superscript denotes the iteration number. In order to explain the OFT procedure, let us define $\Psi = [\phi_1, \phi_2, \ldots, \phi_N]$ = rearrangement (F). The rearrangement is based on the following procedure. At the first step (k=1, denote as the superscript), the first column of the $\Psi$ matrix, $\phi_1 \equiv f_t^{(1)}$, is selected from $f_i^{(1)}$ where $$\|f_t^{(1)}\|^2 = \max\{\|f_i^{(1)}\|^2|_{i=1}^N\} \quad (28)$$

and the first orthogonal basis is:

$$h_1 = \sum_{i=1}^{N} \frac{\langle f_t^{(1)}, f_i^{(1)} \rangle}{\|f_t^{(1)}\|^2} f_t^{(1)} \quad (29)$$

At the kth step, k·2, calculate $f_i^{(k)}$ and $h_k$ as $$f_i^{(k)} = f_i^{(k-1)} - \frac{\langle f_i^{(k-1)}, f_t^{(k-1)} \rangle}{\|f_t^{(k-1)}\|^2} f_t^{(k-1)} \quad (30)$$

$$h_k = \sum_{i=1}^{N} \frac{\langle f_t^{(k)}, f_i^{(k)} \rangle}{\|f_t^{(k)}\|^2} f_t^{(k)} \quad (31)$$

Let the index of selected $f_t^{(k)}$ in original F matrix be j, where $$\|f_t^{(k)}\|^2 = \max\{\|f_i^{(k)}\|^2|_{i=1}^N\} \quad (32)$$

giving $\phi_k = f_j^{(1)}$. This process continues until $\|f_t^{(k)}\|^2 \leq \epsilon$, where $\epsilon = 10^{-6}$.

In this way, the $\Psi$ matrix is obtained from the rearrangement of the F matrix. The columns in the $\Psi$ matrix are rearranged in descending order of the norm of the orthogonal basis contributed by the original f vectors.

To more efficiently express the iterative procedure, Eq. (31) can be reduced to the simple form below.

$$\sum_{i=1}^{N} \frac{\langle f_t^{(k)}, f_i^{(k)} \rangle}{\|f_t^{(k)}\|^2} = \sum_{i=1}^{N} \frac{\left\langle f_t^{(k)}, \left( f_i^{(1)} - \sum_{j=1}^{k-1} \frac{\langle f_i^{(1)}, f_t^{(j)} \rangle}{\|f_t^{(j)}\|^2} f_t^{(j)} \right) \right\rangle}{\|f_t^{(k)}\|^2} \quad (33)$$

$$= \sum_{i=1}^{N} \frac{\langle f_t^{(k)}, f_i^{(1)} \rangle}{\|f_t^{(k)}\|^2} - \sum_{i=1}^{N} \frac{\left\langle f_t^{(k)}, \sum_{j=1}^{k-1} \frac{\langle f_i^{(1)}, f_t^{(j)} \rangle}{\|f_t^{(j)}\|^2} f_t^{(j)} \right\rangle}{\|f_t^{(k)}\|^2}$$

$$= \sum_{i=1}^{N} \frac{\langle f_t^{(k)}, f_i^{(1)} \rangle}{\|f_t^{(k)}\|^2} - \sum_{i=1}^{N} \frac{\sum_{j=1}^{k-1} \frac{\langle f_i^{(1)}, f_t^{(j)} \rangle}{\|f_t^{(j)}\|^2} \langle f_t^{(k)}, f_t^{(j)} \rangle}{\|f_t^{(k)}\|^2}$$

$$= \sum_{i=1}^{N} \frac{\langle f_t^{(k)}, f_i^{(1)} \rangle}{\|f_t^{(k)}\|^2}$$

using the property $\langle f_t^{(k)}, f_t^{(j)} \rangle = 0$, $k \neq j$, since they are orthogonal.

Because $\Psi$ is the rearrangement of F, one can further simplify the inner product in $$\sum_{i=1}^{N} \frac{\langle f_t^{(k)}, f_i^{(1)} \rangle}{\|f_t^{(k)}\|^2},$$

that is $$\sum_{i=1}^{N} \frac{\langle f_t^{(k)}, f_i^{(1)} \rangle}{\|f_t^{(k)}\|^2} = \sum_{i=1}^{N} \frac{\langle f_t^{(k)}, \phi_i \rangle}{\|f_t^{(k)}\|^2}. \quad (34)$$

Thus one has $$h_k = \sum_{i=1}^{N} \frac{\langle f_t^{(k)}, \phi_i \rangle}{\|f_t^{(k)}\|^2} f_t^{(k)} \quad (35)$$

Based on the definition, $f_t^{(k)}$ can be expressed as follows.

$$f_t^{(k)} = \varphi_k - \sum_{i=1}^{k-1} \frac{\langle \varphi_k, \varphi_i \rangle}{\|\varphi_i\|^2} \varphi_i \quad (36)$$

Substituting it to $h_k$ gives $$h_k = \sum_{m=1}^{N} \frac{\left\langle \left( \varphi_k - \sum_{i=1}^{k-1} \frac{\langle \varphi_k, \varphi_i \rangle}{\|\varphi_i\|^2} \varphi_i \right), \varphi_m \right\rangle}{\left\| \varphi_k - \sum_{i=1}^{k-1} \frac{\langle \varphi_k, \varphi_i \rangle}{\|\varphi_i\|^2} \varphi_i \right\|} \left( \varphi_k - \sum_{i=1}^{k-1} \frac{\langle \varphi_k, \varphi_i \rangle}{\|\varphi_i\|^2} \varphi_i \right) \quad (37)$$

Figure 3:
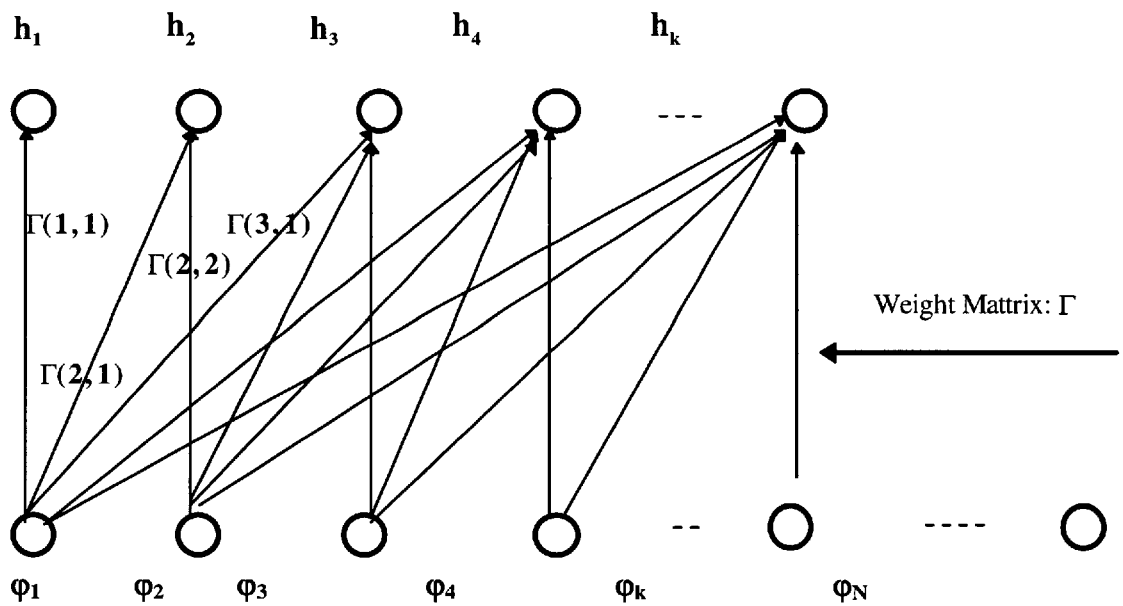
FIG. 3 shows an orthogonal functional transformation layer.

In this way, the orthogonal transformation will only depend on $\Psi$ matrix, that is $H = [h_1 \ h_2 \ \ldots \ h_k] = \Psi^* \Gamma$, where $\Gamma$ is the upper triangular matrix if Eq. (37) is expanded. Based on this transformation, one has an architecture for the new layer, as shown in FIG. 3, in which the lower layer is the basis function nodes and the upper layer is the orthogonal basis nodes. The connection weights are governed by $\Gamma(1, 1)$ from $\phi_1$ to $h_1$; $\Gamma(2, 1)$ from $\phi_1$ to $h_1$, and $\Gamma(2, 2)$ from $\phi_2$ to $h_2$, etc.

The following shows that the new orthogonal basis function set has better convergence when combined with the regularization process. The proof is based on the discussion of the regularization process in Orr.

Theorem

By increasing the norm of each orthogonal basis function, regularization process convergence is improved where the objective function is defined by $E = e^T e + \lambda g^T g$. Here g represents the connection weights from the orthogonal basis function nodes to the output node.

Proof: The analytic form of the objective function: $E = e^T e + \lambda g^T g$, can be expressed in the following (as shown in Orr):

$$E = e^T e + \lambda g^T g = y^T V y \quad (38)$$

Here V is the projection matrix $V = I_p - H(H^T H + \lambda I_k)^{-1} H^T$, H is the orthogonal basis matrix, and P is the number of training patterns.

The training error between two consecutive steps is from Orr:

$$\Delta E_m = E_{m-1} - E_m = \frac{\langle y, h_i \rangle^2}{h_i^T h_i + \lambda} \quad (39)$$

$$= \frac{\|y\|^2 \cos^2_{y, h_i}(\theta) * h_i^T h_i}{h_i^T h_i + \lambda}$$

$$= \frac{\|y\|^2 \cos^2_{y, h_i}(\theta)}{1 + \frac{\lambda}{h_i^T h_i}}$$

Here $E_i$ is the regularized objective function value in the ith step, and $h_i$ is the orthogonal basis obtained in the ith step.

From Eq. (39), it is clear that, unlike Orr, in this case the larger the $h_i^T h_i$ is, the larger $\Delta E$ is. Hence better convergence for a for a regularized objective function can be achieved by means of increasing the orthogonal basis functions.

Figure 4:
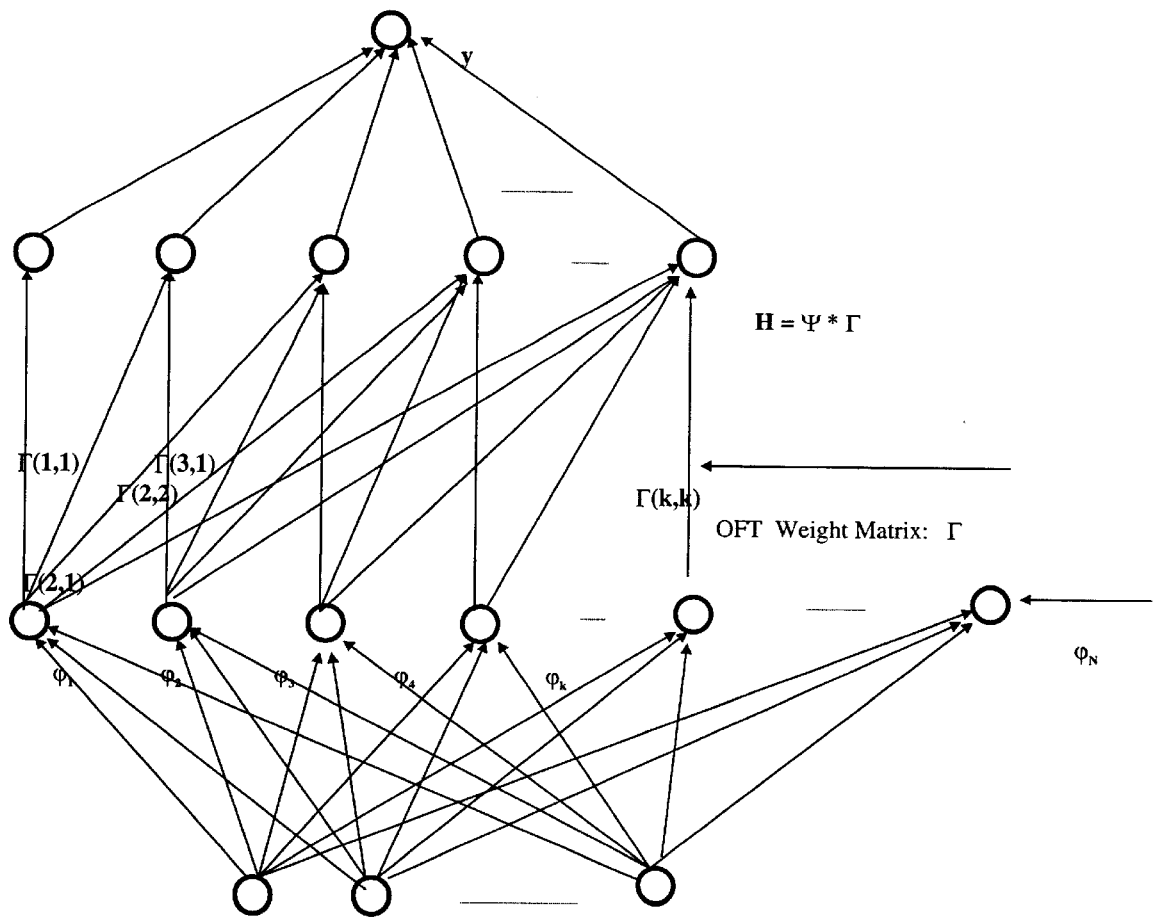
FIG. 4 shows a neural network architecture with an orthogonal functional transformation layer.

Based on the above discussion, a new neural network architecture, OFBNN, is obtained, as shown in FIG. 4, in which an extra layer for orthogonal transformation is added. Later in the learning algorithm discussed below, this extra hidden layer can be further combined together with the functional basis, $\Psi$, through the subset selection that forms a new 'single layer' orthogonal functional basis neural network.

The learning algorithm for OFBNN is summarized as follows.

Algorithm Orthogonal Functional Basis Functional Mapping (OFBFM)

Input: The training patterns $$\{x_t, y_t\}_{t=1}^{P}.$$

Output: The connection weights, g, the orthogonal basis set, H, the subset, $H_{subset}$, the linear weight, w, connected from the nodes in $\Psi$ layer to the output nodes, and the mapping.

Step 1. Construct a Heterogeneous Regressor Set:, $$F = \{f_i\}_{i=1}^{N}:$$

Build the regressor matrix F of size P*M, where P is the number of training patterns. Each column of the F matrix is a basis. As opposed to the traditional approach, e.g., RBF or FLN, in which either Gaussian or sigmoid basis are used, using here a combination of heterogeneous functions. In this implementation, functional basis are randomly picked from a set of heterogeneous basis functions. In the next section are also presented results of some simulations that compare using heterogeneous functions with Gaussian-only function. The functions used are:

Gaussian Function: $f(x) = e^{-\frac{(x-c)^2}{r^2}}$

Sigmoid Function: $f(x) = \frac{1}{1+e^{-\lambda x}}$

Cauthy Function: $f(x) = \frac{r^2}{(x-c)^2 + r^2}$

Multi-quadratic Function: $f(x) = \frac{\sqrt{(x-c)^2 + r^2}}{r}$

Inverse multi-quadratic Function: $f(x) = \frac{r}{\sqrt{(x-c)^2 + r^2}}$

Note: c and r are the inner parameters of the corresponding function.

Step 2: Build Orthogonal Basis Matrix H According to Eq. (37)

Step 3: Initialization

Let $H_{subset} = \phi$, where $\phi$ is an empty set and let $k=1$.

Step 4 Subset Selection, Regularization, and Generalized Cross Validation: (GCV)

The original mapping problem in Eq. (5) can be transformed to the following form:

$$y = Hg + e \qquad (40)$$

With zero-order regularization employed, the objective function is $$E = e^T e + \lambda g^T g \qquad (41)$$

A similar approach can be used to find the most efficacious subset of H (Orr). The GCV is used as the stopping criterion.

Find $h_i$ such that:

$$\max_i \left\{ \frac{(y^T h_i)^2}{\lambda + (h_i)^T h_i} \right\} \qquad (42)$$

Include $h_i$ as an element of the $H_{subset}$, i.e., $H_{subset} = H_{subset} \cup h_i$.

Because all the columns in H are orthogonal to each other, in implementation of selecting $H_{subset}$ one can set the corresponding selected column to 0, and the next $h_i$ that satisfies Eq. (42) can be selected easily. Compared with the computational cost of order $O(P^2)$--$O(P^3)$ for $h_i$ shown in Orr where:

$$H = H - \frac{h_t h_t^T H}{h_t^T h_t} \qquad (43)$$

$h_t$ is the selected orthogonal basis from Eq. (42), the process of the present invention is much more efficient. In general, the computational complexity to generate the H matrix using the OFT method described above is of the order of $O(k*N)$, where k is the rank of F and N is the number of the given regressors. In functional mapping, where P>>N, the approach of the present invention takes advantage of replacing the complicated process of updating orthogonal basis with a pre-selection process.

For regularization, modify $\lambda$ based upon the GCV derivation as described by Orr. Denote $$Z \text{ as } I_P - \sum_{h_i \in H_{subset}} \left\{ \frac{h_i h_i^T}{1 + h_i^T h_i} \right\},$$

$\lambda$ is modified with the following equation:

$$\lambda = \frac{[\partial trace(Z)/\partial \lambda] y^T Z^2 y}{trace(Z) h_t^T (H^T H + \lambda I_k)^{-1} h_t} \qquad (44)$$

In each step, $\rho$ is calculated per Orr.

$$\rho = \frac{1}{P} \frac{\|Zy\|^2}{([(1/P)trace(Z)])^2} \qquad (45)$$

Stop if $\rho$ reaches its minimum point; otherwise $k=k+1$, repeat this step.

End of OFBFM Learning Algorithm

Figure 5:
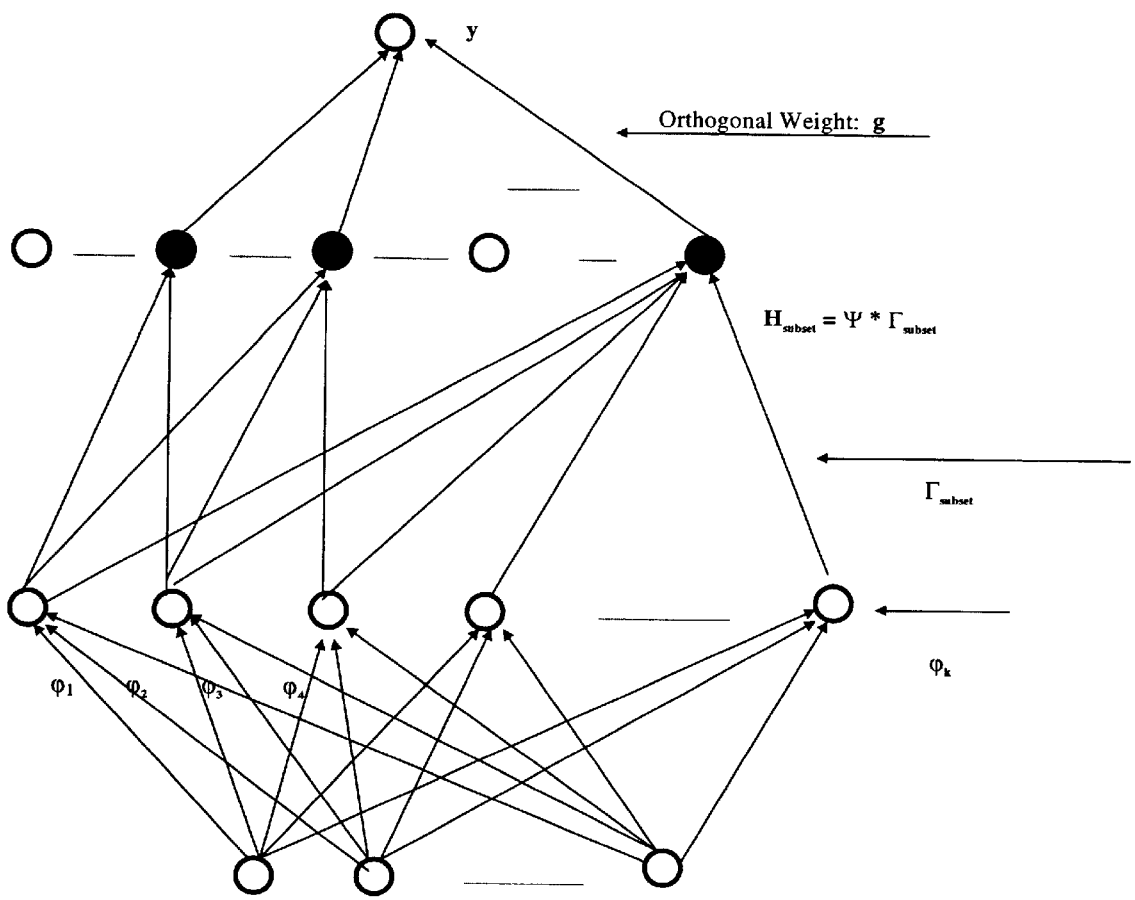
FIG. 5 shows a neural network with a subset of the orthogonal basis, with dark nodes being selected by orthogonal functional basis neural network (OFBNN) learning method according to the teachings of the present invention.
Figure 6:
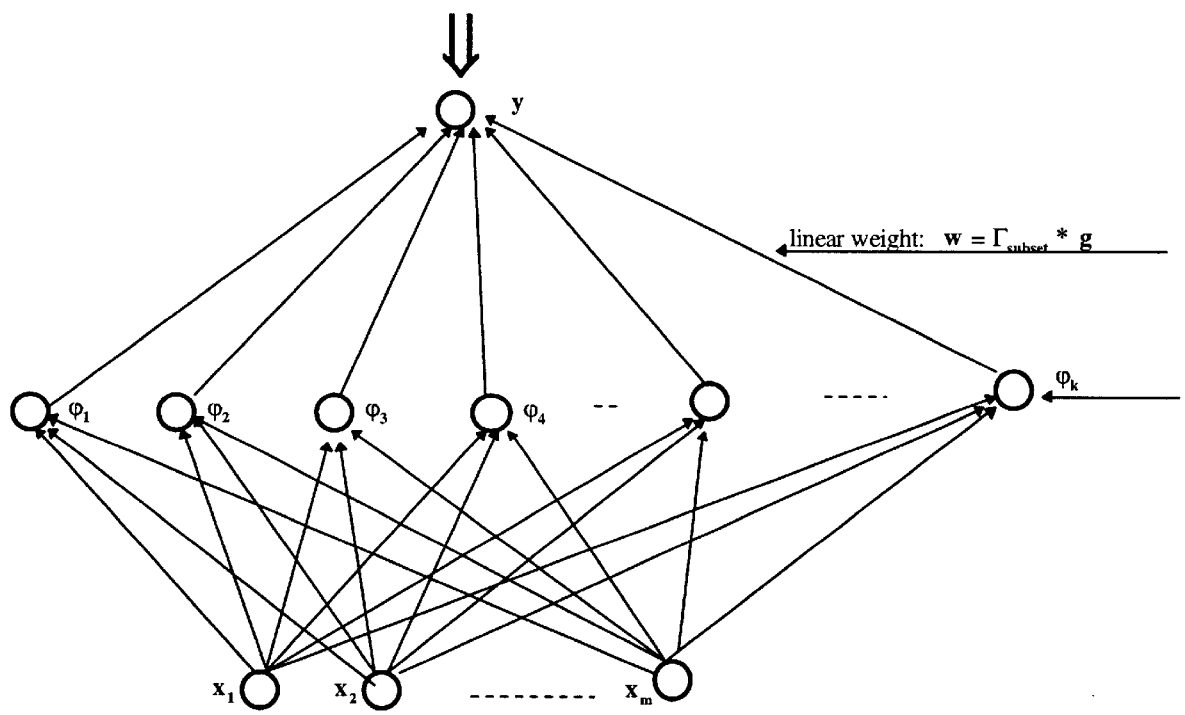
FIG. 6 shows the final efficacious structure of an orthogonal functional basis neural network (OFBNN) according to the teachings of the present invention.

The OFBFM finds the $H_{subset}$ with d basis, and the orthogonal weights $g=[g_1, \ldots, g_d]$. Since $H=\Psi*\Gamma$ and $H_{subset}$ is the subset of the H, one has $H_{subset} = \Psi*\Gamma_{subset}$. Finally, the system equation is:

$$\hat{y} H_{subset}*g = \Psi*\Gamma_{subset}*g = \Psi*w \qquad (46)$$

where $w = \Gamma_{subset}*g$ is the equivalent final weight from the original basis nodes to the output nodes. In this way, one can simplify the OFBNN architecture from FIG. 4 to one 'single layer' structure as shown in FIG. 5 and FIG. 6, where dark nodes in FIG. 5 are being selected by the OFBFM algorithm. The final neural network is shown in FIG. 6, where $w = \Gamma_{subset}*g$. The following section demonstrates the performance of the proposed algorithm and network using several examples.

EXAMPLES

OFBNN is applied to four example problems. For benchmark purposes, each problem employs Regularization for RBF (RRBF) as proposed by Orr. These examples illustrate the improved accuracy of the proposed method over RRBF relative to generalization mean square error (MSE). The first example is a simple linear function with random Gaussian noise. This is a very interesting problem for testing a network's regularization and generalization capabilities. The second example involves a one-dimensional Hermite polynomial. This example was also used by Orr. The third example is a gasoline blending problem. The last example is a 3-dimensional problem.

MSE is defined as follows, $$MSE = \frac{1}{N} \sum_{i=1}^{N} (y_i - \hat{y}_i)^2$$

and is used for all measurements (training and testing), where N denotes the number of testing patterns, $y_i$ and $\hat{y}_i$ are the target and predicted target values, respectively.

It should be noted that for each problem the proposed approach uses fewer basis functions, because of more effective subset selection, and yields better generalization results.

Example 1

Figure 7:
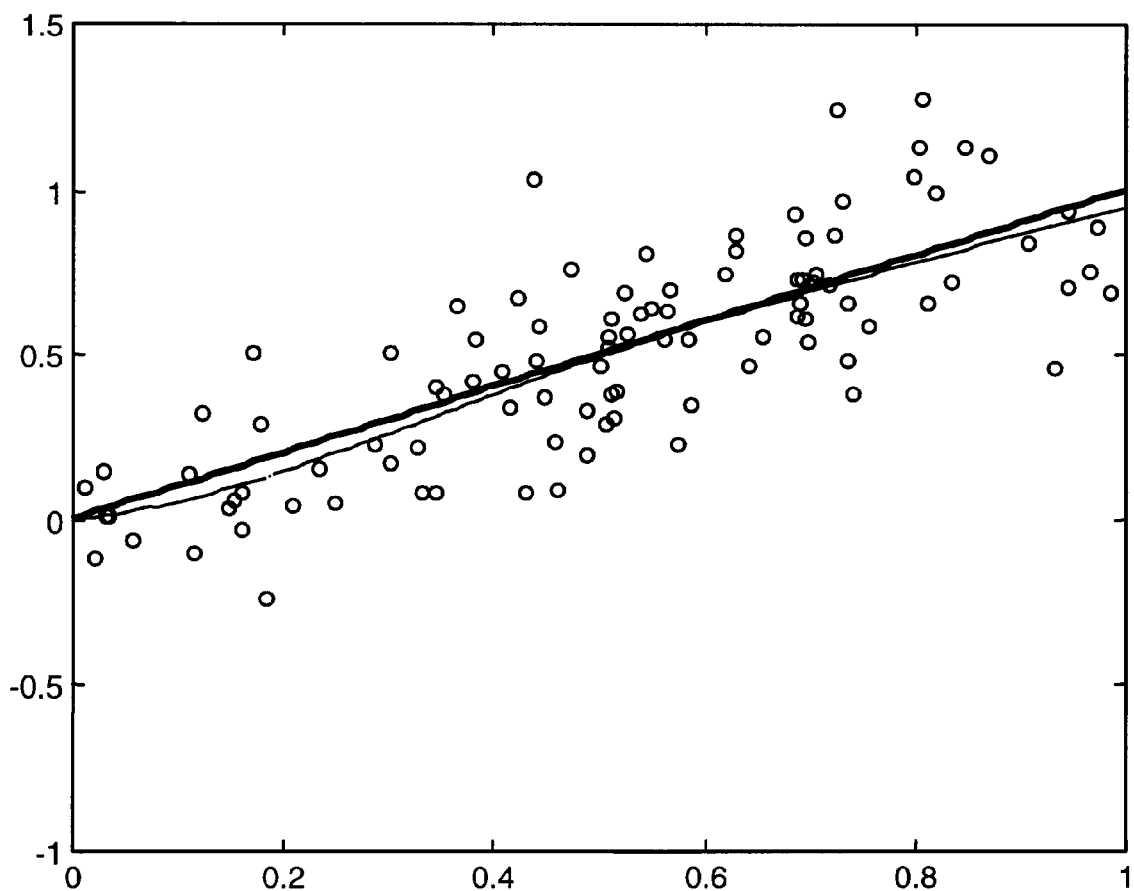
FIG. 7 shows an example of highly noisy data with an imbedded linear function f(x)=x, where circles are the training data, the thick line is the result of the OFBNN approach and the thin line is the result of the prior art Regularization for Radial Basis Function (RRBF) approach.

A linear function $f(x)=x, 0 \leq x \leq 1$ is given. Random Gaussian noise [0, 1] with a zero mean and standard deviation 0.4 is added to 100 training patterns. A second data set involving 500 testing patterns ranging from x=0.002, 0.004, 0.006, . . . , 0.998, 1.00 are uniformly generated. Initially, 100 Gaussian basis nodes (width ρ=0.5) are provided as the basis candidate selection set for RRBF. In the approach of the present invention, 100 heterogeneous functions with random parameters are used. The final RRBF has 6 basis functions, while OFBNN has only one basis functions. In FIG. 7, the training data set is depicted by the plotted white-filled circles and the function ƒ(x) is plotted by the solid line. From this figure, although the training data is highly contaminated (1:1 signal to noise ratio), both methods yield a fairly good result. The generalization MSE for RRBF is 0.0014 and the generalization MSE for OFBNN is 4.3630e-04. The generalization result of the OFBNN is depicted as the thicker of the two lines and the generalization result of RRBF is depicted as the thin line.

Example 2

The Hermite Polynomial function shown below as the second example is used.

$$f(x) = 1.1(1 - x + 2x^2)\exp\left(-\frac{x^2}{2}\right) \quad (47)$$

Figure 8:
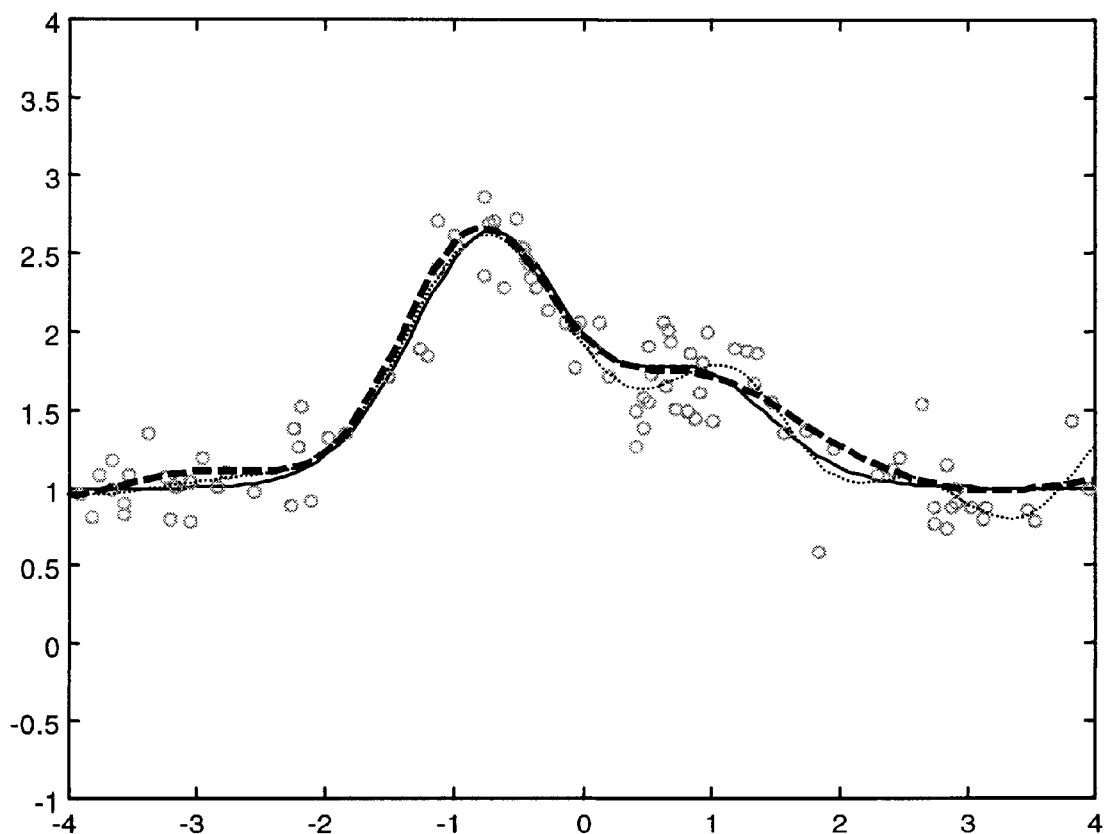
FIG. 8 shows a Hermite polynomial training set of data, where circles are the training patterns, the solid curve is the Hermite polynomial, the thick dash line is the RRBF result with 0.0042 generalization Mean Square Error (MSE) and the thin dash curve is the OFBNN result using the teachings of the present invention with 0.0017 generalization MSE.

This is one of the examples used by Orr in competing alternative methods in a noise contaminated environment. A random Gaussian noise between [−4, 4] with a zero mean and standard deviation 0.2 is added to each of 100 training patterns. A set of 500 testing patterns with x generated uniformly in the interval of [−4, 4] is used for testing the generalization result. Initially, 100 Multi-quadratic basis functions (width ρ=1.0) are provided as the basis candidates for RRBF; and 100 heterogeneous functions with random parameters are used for the approach of the present invention. The final RRBF neural network has 15 basis functions while OFBNN requires only 9 basis functions. In FIG. 8, the training data set was depicted by the circle and the function ƒ(x) was plotted by the solid curve. Again the OFBNN has better generalization than RRBF with very highly contaminated data. The generalization MSE for RRBF is 0.0042 and for OFBNN is 0.0017.

In this example, as Orr pointed out using his RRBF, the generalization result was much better than those of obtained from other methods, such as OLS-PRESS and OLS-MSRE (Orr). It can be seen that the OFBNN generalization result is much better than that obtained from RRBF. Also, the OFBNN uses fewer basis than previous approaches.

Example 3

Gasoline blending data is considered as proposed by Berliner in Berliner, L. M., 1987, "Bayesian control in Mixture Models,", *Technometrics,* November 1987,Vol.29, No.,4 pp 455–460. The data is listed below.

| Gasoline Blending Data | | | | | |
|---|---|---|---|---|---|
| $x_1$ | $x_2$ | $x_3$ | $x_4$ | $x_5$ | y |
| 0.000 | 0.000 | 0.350 | 0.600 | 0.600 | 100.0 |
| 0.000 | 0.300 | 0.100 | 0.000 | 0.600 | 101.0 |
| 0.000 | 0.300 | 0.000 | 0.100 | 0.600 | 100.0 |
| 0.150 | 0.150 | 0.100 | 0.600 | 0.000 | 97.3 |

-continued

| Gasoline Blending Data | | | | | |
|---|---|---|---|---|---|
| $x_1$ | $x_2$ | $x_3$ | $x_4$ | $x_5$ | y |
| 0.150 | 0.000 | 0.150 | 0.600 | 0.100 | 97.8 |
| 0.000 | 0.300 | 0.049 | 0.600 | 0.051 | 96.7 |
| 0.000 | 0.300 | 0.000 | 0.489 | 0.211 | 97.0 |
| 0.150 | 0.127 | 0.023 | 0.600 | 0.100 | 97.3 |
| 0.150 | 0.000 | 0.311 | 0.539 | 0.000 | 99.7 |
| 0.000 | 0.300 | 0.285 | 0.415 | 0.000 | 99.8 |
| 0.000 | 0.080 | 0.350 | 0.570 | 0.000 | 100.0 |
| 0.150 | 0.150 | 0.266 | 0.434 | 0.000 | 99.5 |
| 0.150 | 0.150 | 0.082 | 0.018 | 0.600 | 101.9 |
| 0.000 | 0.158 | 0.142 | 0.100 | 0.600 | 100.7 |
| 0.000 | 0.000 | 0.300 | 0.416 | 0.239 | 100.9 |
| 0.150 | 0.034 | 0.116 | 0.100 | 0.600 | 101.2 |
| 0.068 | 0.121 | 0.175 | 0.444 | 0.192 | 98.2 |
| 0.067 | 0.098 | 0.234 | 0.332 | 0.270 | 100.5 |
| 0.000 | 0.300 | 0.192 | 0.208 | 0.300 | 100.6 |
| 0.150 | 0.150 | 0.174 | 0.226 | 0.300 | 100.6 |
| 0.075 | 0.225 | 0.276 | 0.424 | 0.000 | 99.1 |
| 0.075 | 0.225 | 0.000 | 0.100 | 0.600 | 100.4 |
| 0.000 | 0.126 | 0.174 | 0.600 | 0.100 | 98.4 |
| 0.075 | 0.000 | 0.225 | 0.600 | 0.100 | 98.2 |
| 0.150 | 0.150 | 0.000 | 0.324 | 0.376 | 99.4 |
| 0.000 | 0.300 | 0.192 | 0.508 | 0.000 | 98.6 |

Figure 9:
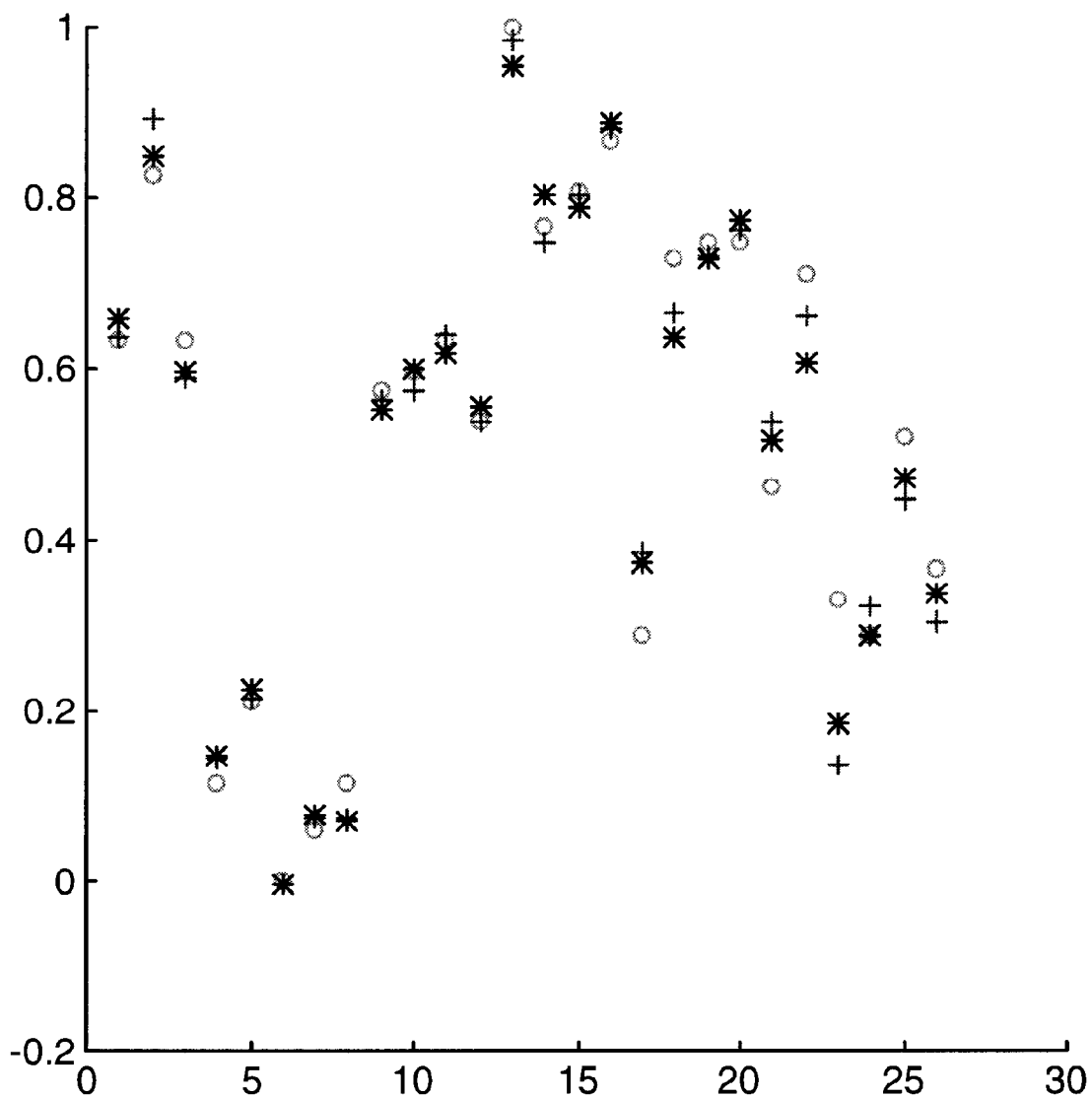
FIG. 9 shows example gasoline blending data where circles are training patterns, the plus signs are the predictions using RRBF with 0.0030 MSE and the asterisks are the predictions using OFBNN according to the teachings of the present invention with 0.0025 MSE.

In this data set, there are 26 gasoline blending patterns. Each pattern has 6 features. This example will use 5 features, $x_1$, $x_2$, $x_3$, $x_4$, $x_5$, as the input. The network will learn the functionality between these 5 features and the sixth one. Twenty patterns are randomly picked for training, the other 6 patterns are used to test the generalization performance. Initially, 20 Gaussian basis nodes (width ρ=1.0) are provided as basis candidates for RRBF and 20 heterogeneous functions with random parameters are provided for OFBNN. As a consequent of training, the RRBF selects 12 basis, while OFBNN requires only 6 basis. The result is shown in FIG. 9. The generalization MSE for RRBF is 0.0030 and the generalization MSE for OFBNN is 0.0025. The generalization result of the OFBNN is depicted as the star (*) and the generalization result of RRBF is depicted as the as plus (+).

Example 4

A 3-dimensional sine wave is considered as follows:

$$f(x, y)=(1-y^2)*\sin(\pi x) \quad (48)$$

Figure 10:
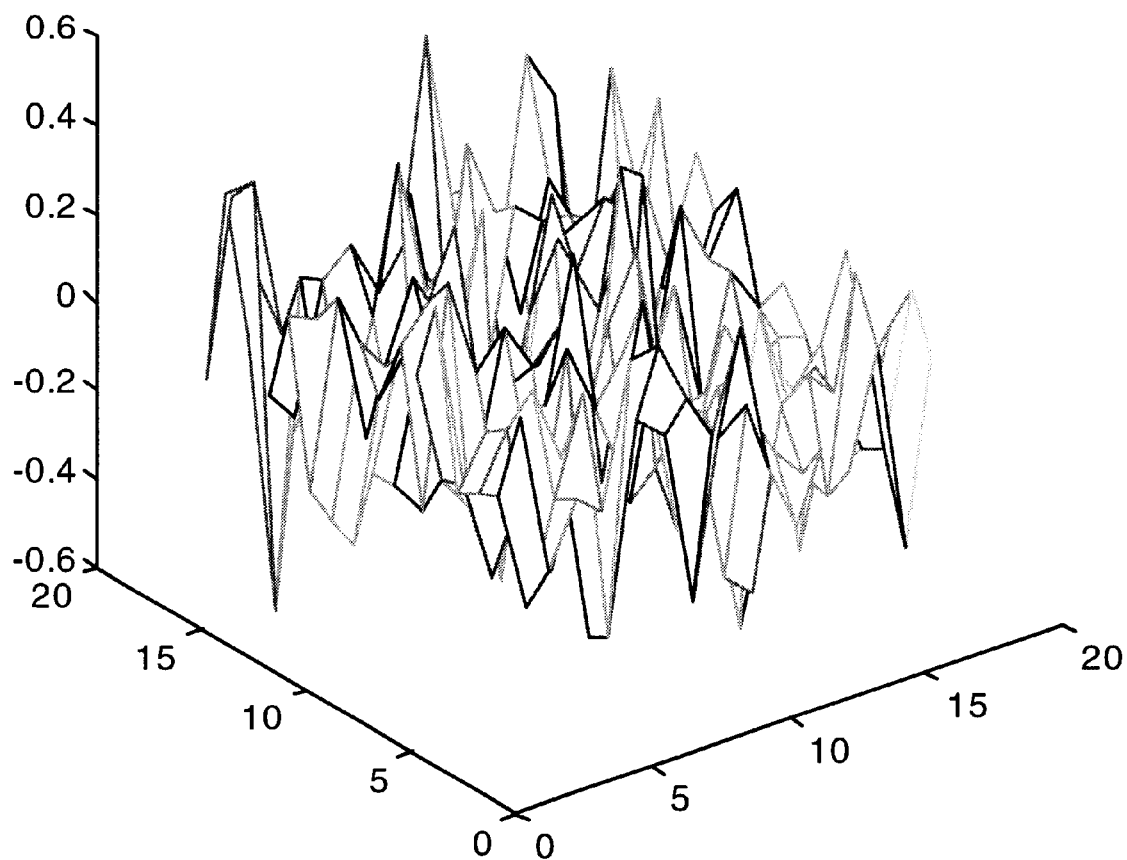
FIG. 10 shows a plot of a 3-D random Gaussian noise (15*15) with standard deviation 0.2.
Figure 11:
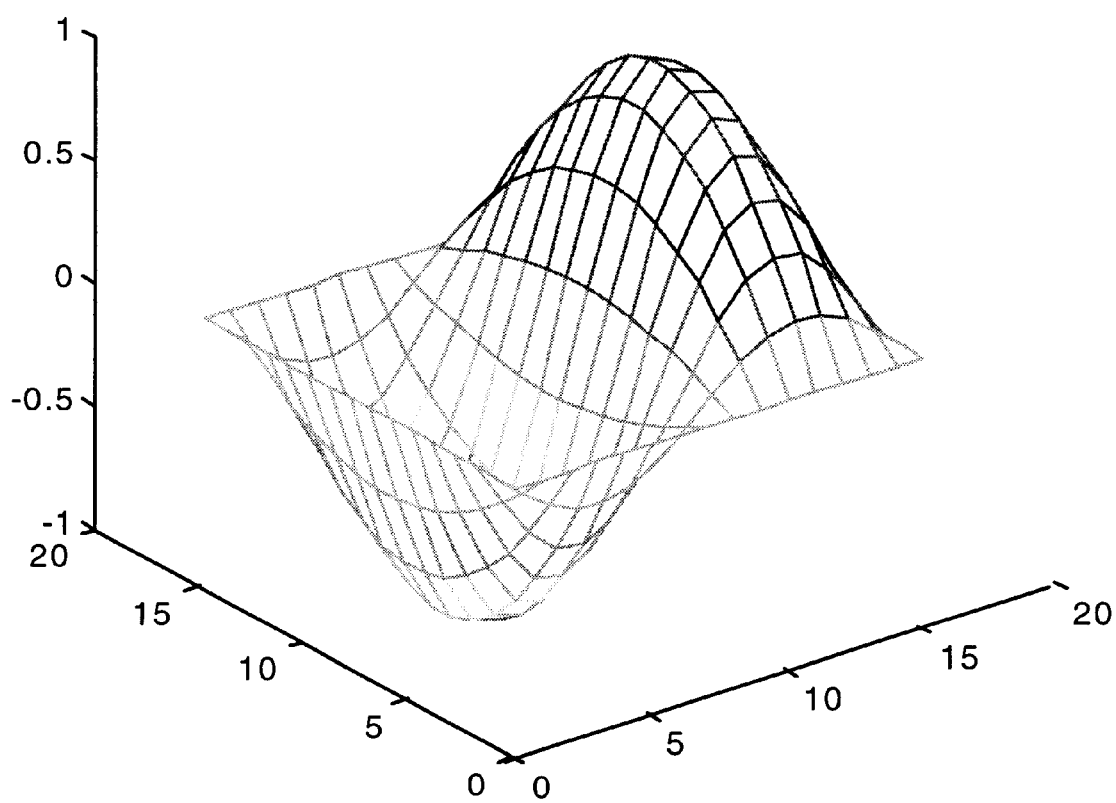
FIG. 11 shows a plot of a 3-D sine wave.
Figure 12:
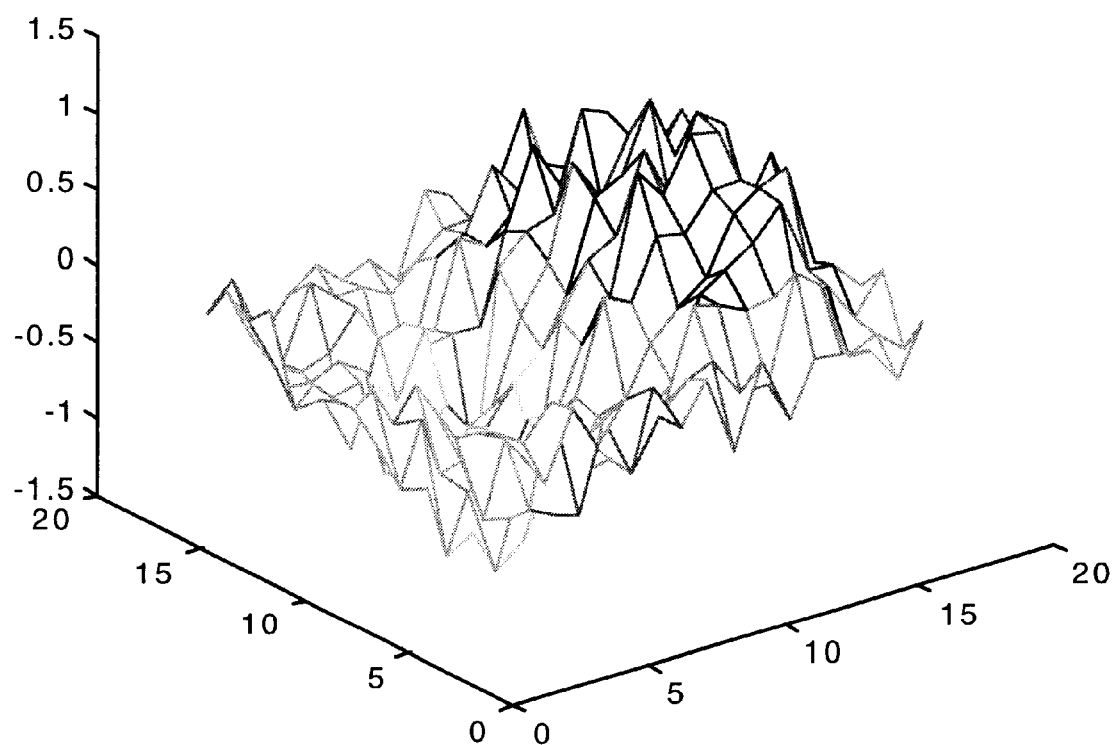
FIG. 12 shows a plot of training patterns with noise added to the 3-D sine wave of FIG. 12.
Figure 13:
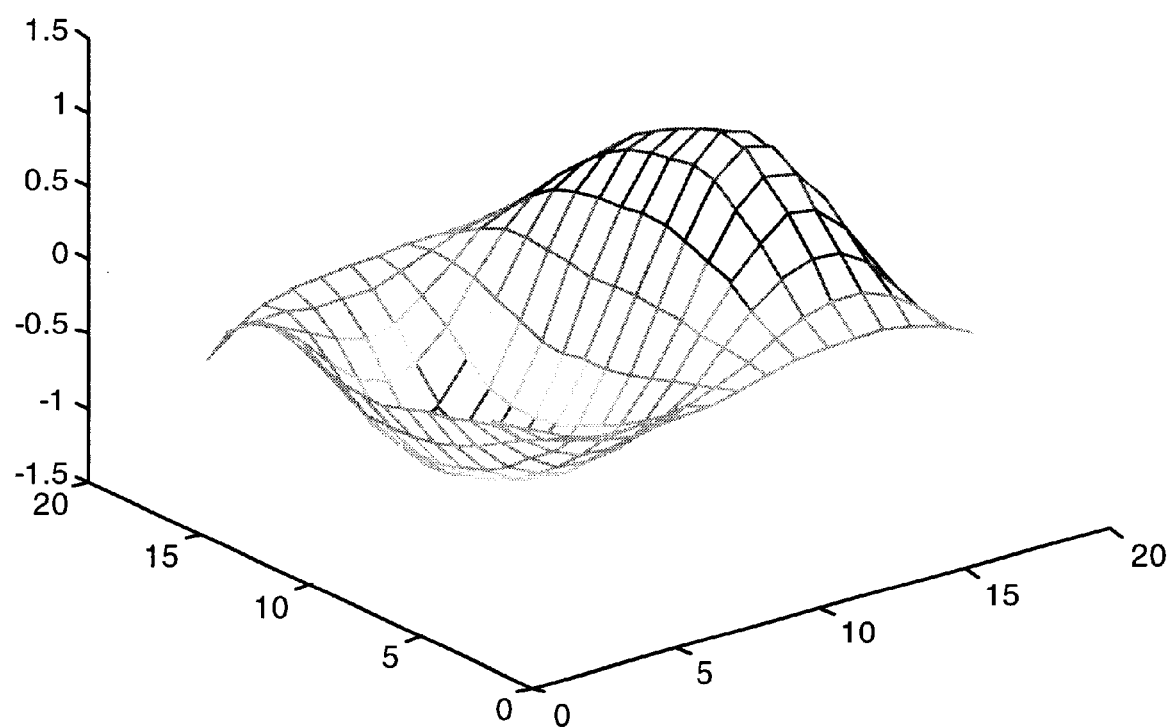
FIG. 13 shows a plot of the learned result using RRBF having 0.0086 MSE and using 33 Guassian nodes.
Figure 14:
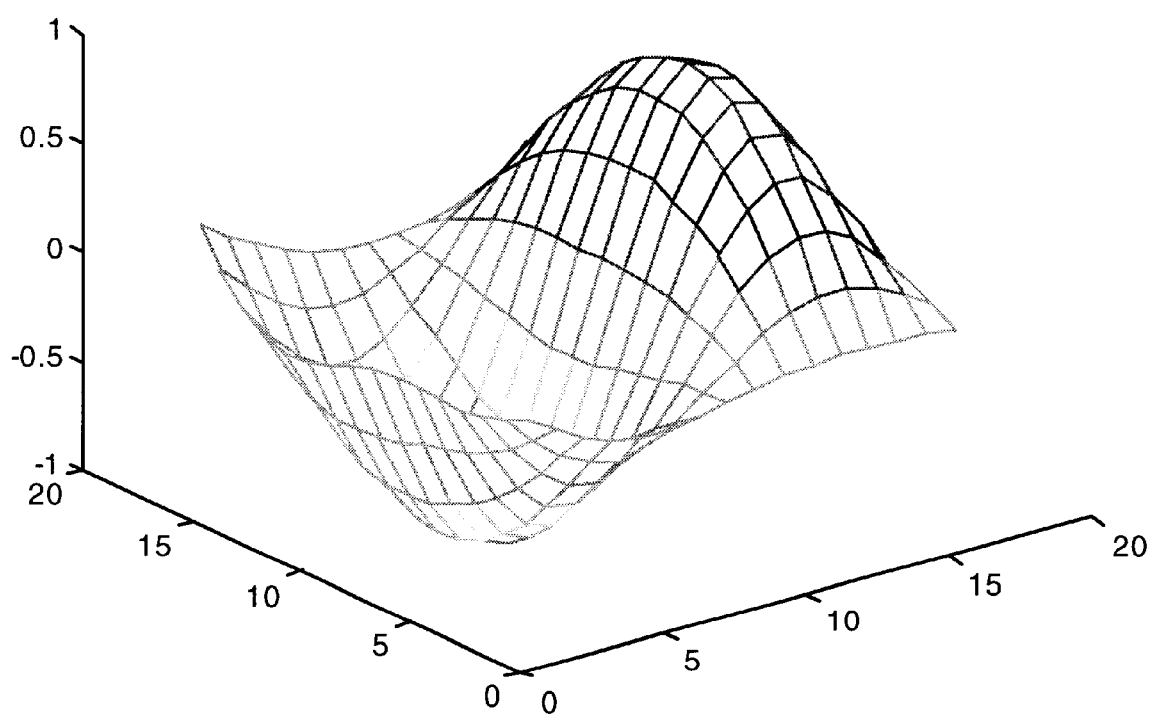
FIG. 14 shows a plot of the learned result using OFBNN according to the teachings of the present invention having 0.0086 MSE and using 19 heterogeneous nodes.
Figure 15:
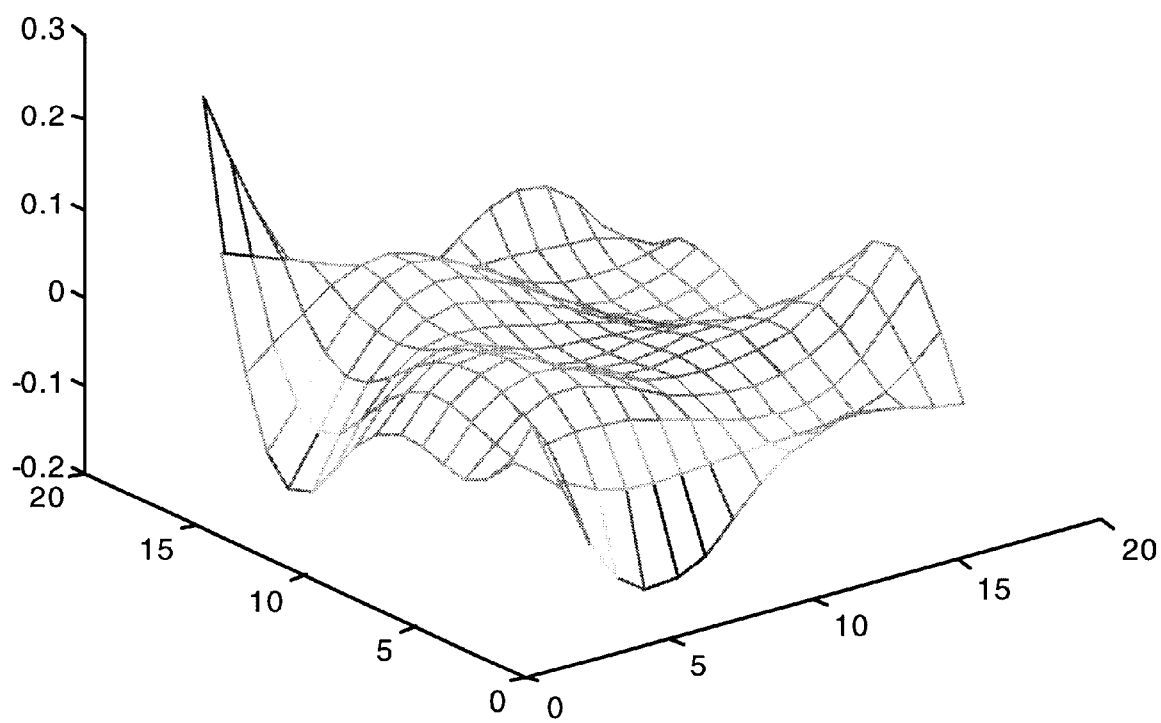
FIG. 15 shows a plot of the difference between the OFBNN learned result and the actual function.
Figure 16:
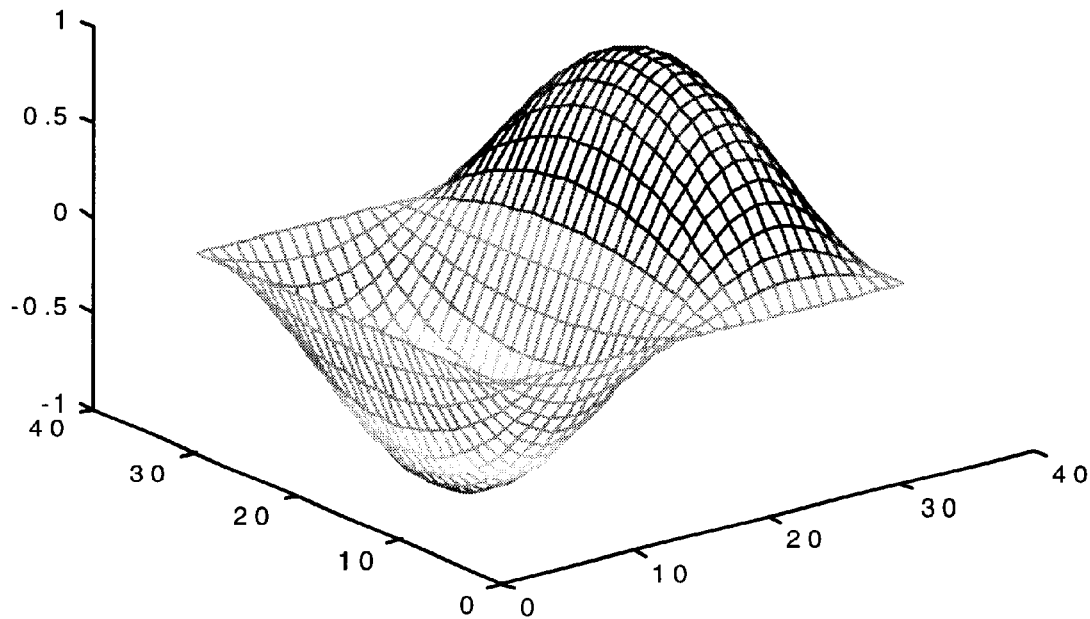
FIG. 16 shows a plot of a 900 data points 3-D sine wave for testing a generalization.
Figure 17:
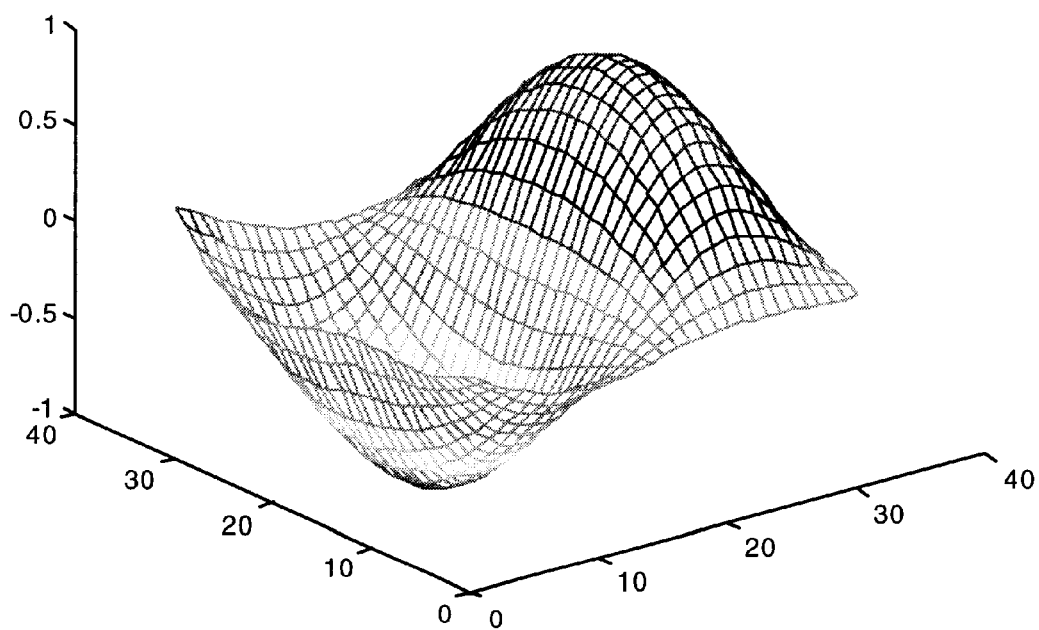
FIG. 17 shows the generalization result from FIG. 16 using OFBNN, the resulting network having 0.0068 MSE; and, FIG. 18 shows a plot of the difference between the OFBNN learned result and the actual function.
Figure 18:
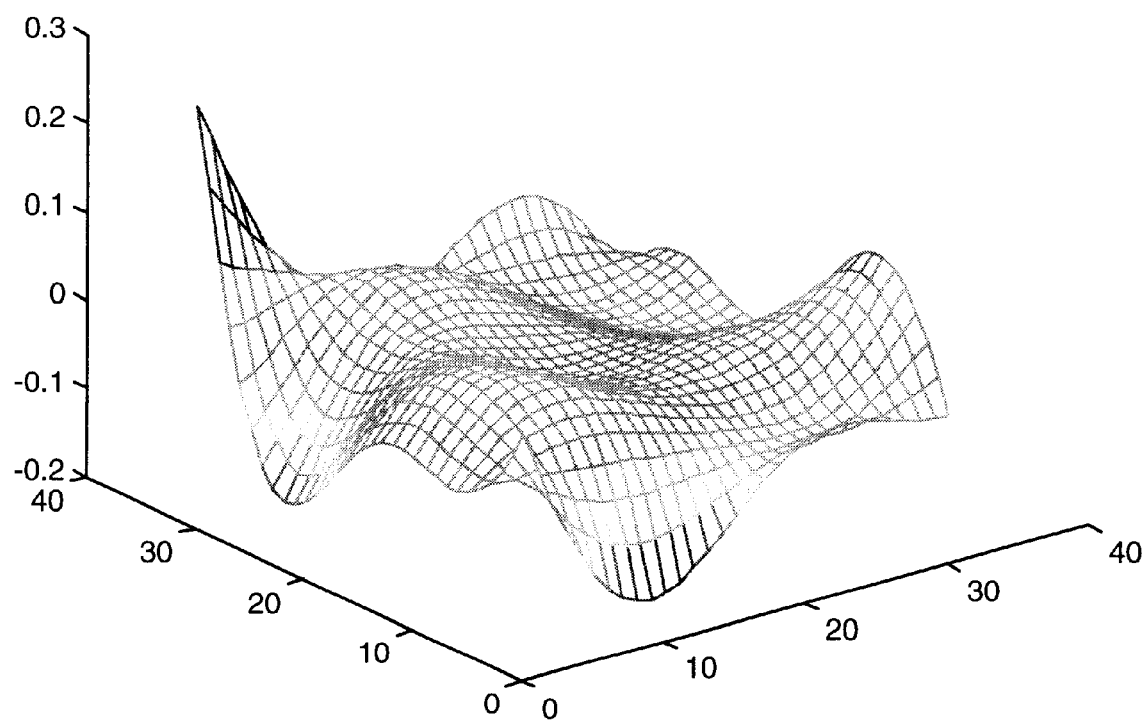

A set of 225 (15*15) training patterns, with random Gaussian noise, are generated uniformly from the interval [−1, 1]. The noise added to each pattern is with zero mean and standard deviation 0.2 as depicted in FIG. 10. The original 3-dimensional data (signal) is depicted in FIG. 11 with the combined signal and noise is captured in FIG. 12. Initially, 225 Gaussian basis nodes (width ρ=1.0) and 225 heterogeneous functions with random parameters are used as basis candidates for RRBF and OFBNN, respectively. The final RRBF neural network has 33 basis functions using RRBF approach, while the OFBNN requires only 19 basis functions. The training results for RRBF and OFBNN are shown in FIGS. 13 and 14, respectively. The generalization MSE for RRBF is 0.0086 and the generalization MSE for OFBNN is 0.0022. The difference between the OFBNN and the actual function is shown in FIG. 15. Another set of 900 (30*30) testing data, shown in FIG. 16, is also generated in the interval between [−1, 1] to test the final networks. The generalized result is shown in FIG. 17. In this case, the generalization MSE is 0.0068 for OFBNN, while the MSE result for RRBF is 0.0114. The difference between FIG. 17 and FIG. 16 is plotted in FIG. 18. Furthermore, only Gaussian-only functions are used for OFBNN and heterogeneous functions for RRBF for more testings. The testing result is shown in Table 1. The comparison again illustrates that the new method yields a more efficient and accurate functional approximation of the signal.

TABLE 1

Comparison of RRBF and OFBNN

| | Gaussian function | | Heterogeneous Functions | |
|---|---|---|---|---|
| | Training MSE (15*15) | Testing MSE (30*30) | Training MSE (15*15) | Testing MSE (30*30) |
| RRBF | 0.0086 | 0.0114 | 0.0035 | 0.0095 |
| QFBNN | 0.0031 | 0.0075 | 0.0022 | 0.0068 |

The above are comparisons of functional approximation methods—specifically regularization and the traditional view of subset selection. This description elucidates inherent problems with these methods when attempting to learn an efficient and accurate functional approximation and explains a new approach, referred to as the Orthogonal Functional Transformation (OFT), and a new neural network architecture, Orthogonal Functional Basis Neural Network (OFBNN), to address these problems. It is shown that by using the new approach, better convergence speed in the regularization process can be achieved. Also the computational complexity is less than that proposed by Orr regarding "regularization in the selection of RBF centers." The described OFT method not only uses fewer basis functions in the final neural network structure, but also achieves more accurate generalization results. Several examples are used for testing the method of the present invention, and from which, simulation results have demonstrated the reduced architecture and improved computational tractiveness, and most importantly, an improvement in approximation accuracy relative to functional mapping of input to output.

The disclosed method for functional approximation successfully demonstrates the advantages of an improved subset selection procedure and a resulting more efficient neural network. Although the disclosed invention is specialized, its teachings will find application in other areas where computational techniques are overly complex.

The definitions of the variables used in the following claims should be self-evident from this Detailed Description of the invention. As an aid to the reader, some of those definitions are repeated here. P is understood to be the number of training patterns, that is, the empirical data elements used to train the neural network, where each individual data element is described as x and y coordinates $x_t$ and $y_t$. N is understood to be the number of heterogeneous basis functions randomly chosen for building a matrix F. As described in Step 1 of the description of the invention, a useful set of such basis functions are the. five listed in Step 1 which are chosen with random parameters. As described in the first example of the present invention, a value of 100 heterogeneous functions with random parameters gives good results. F is the original regressor matrix of the randomly selected basis functions which is rearranged to make the matrix $\Psi$ which is then used to make H, the orthogonal basis matrix of parameters for the individual orthogonal basis functions $h_k$ that make up H and describe a neural net that closely approximates the actual function creating the empirical data set. The variable k is the rank (number of linearly independent columns) of the original basis matrix F, such that k increases stepwise from 1 until the described function $\|f_t^{(k)}\|^2 \leq \epsilon$, where the minimum value $\epsilon$ is usually $10^{-6}$.

Those with skill in the art of the invention will readily see various other modifications than those disclosed to the disclosed methods. It is understood, therefore, that other modifications to the invention may be made, as might occur to one with skill in the field of this invention, within the scope of the appended claims. All embodiments contemplated have not been shown in complete detail. Other embodiments may be developed without departing from the spirit of this invention or from the scope of the claims.

We claim:

1. A method for choosing a set of orthogonal basis functions for a function approximation from empirical data described as $$\{x_t, y_t\}_{t=1}^P,$$

comprising the steps of:

(a) constructing a heterogeneous regressor set $$F = \{f_i\}_{i=1}^N$$

from a set of randomly selected basis functions;

(b) defining $\Psi$ as $\Psi \equiv [\phi_1, \phi_2, \ldots, \phi_N]$=rearrangement (F) by at a first step k=1, denoting a first column of the $\Psi$ matrix, $\phi_1 \equiv f_t^{(1)}$, selected from $f_i^{(1)}$ where $$\|f_t^{(1)}\|^2 = \max\{\|f_i^{(1)}\|^2\}_{i=1}^N$$

and the first orthogonal basis is $$h_1 = \sum_{i=1}^N \frac{\langle f_t^{(1)}, f_i^{(1)} \rangle}{\|f_t^{(1)}\|^2} f_t^{(1)};$$

(c) building an orthogonal basis matrix H by at a kth step, where $k \geq 2$, calculate $f_i^{(k)}$ and $h_k$ as $$f_i^{(k)} = f_i^{(k-1)} \frac{\langle f_i^{(k-1)}, f_t^{(k-1)} \rangle}{\|f_t^{(k-1)}\|^2} f_t^{(k-1)},$$

$$h_k = \sum_{i=1}^N \frac{\langle f_t^{(k)}, f_i^{(k)} \rangle}{\|f_t^{(k)}\|^2} f_t^{(k)},$$

such that $h_k$ can be simplified as $$h_k = \sum_{m=1}^N \frac{\left( \left( \varphi_k - \sum_{i=1}^{k-1} \frac{\langle \varphi_k, \varphi_i \rangle}{\|\varphi_i\|^2} \varphi_i \right), \varphi_m \right)}{\left\| \varphi_k - \sum_{i=1}^{k-1} \frac{\langle \varphi_k, \varphi_i \rangle}{\|\varphi_i\|^2} \varphi_i \right\|^2} \left( \varphi_k - \sum_{i=1}^{k-1} \frac{\langle \varphi_k, \varphi_i \rangle}{\|\varphi_i\|^2} \varphi_i \right), \text{ where}$$

$$\varphi_k = f_t^{(k)};$$

(d) initializing by letting $H_{subset} = \phi$, where $\phi$ is an empty set and let k=1;

(e) finding $h_i$ such that $$\max_i \left\{ \frac{(y^T h_i)^2}{\lambda + (h_i)^T h_i} \right\}; \text{ and,}$$

(f) including $h_i$ as an element of the $H_{subset}$ such that $$H_{subset} = H_{subset} \cup h_i;$$

(g) regularizing by modifying the generalized cross validation variable $\lambda$ by letting the index of selected $f_t^{(k)}$ in the original F matrix be j, where $$\|f_t^{(k)}\|^2 = \max\{\|f_i^{(k)}\|^2\big|_{i=1}^N\},$$

such that $\phi_k = f_j^{(1)}$; and, (h) stopping if $\|f_t^{(k)}\|^2 \leq \epsilon$, where $\epsilon$ is a preselected minimum value, otherwise letting k = k+1 and repeating beginning at step (e).

2. A method for controlling a physical process, comprising the steps of:

(a) obtaining a set of empirical data from the physical process;

(b) determining a function approximation of the physical process from the empirical data, the determination including the steps of:

(i) choosing a set of orthogonal basis functions for a function approximation from empirical data obtained from a physical process, the empirical data described as $$\{x_t, y_t\}_{t=1}^P,$$

comprising the steps of:

(ii) constructing a heterogeneous regressor set $$F = \{f_i\}_{i=1}^N$$

from a set of randomly selected basis functions;

(iii) defining $\Psi$ as $\Psi \equiv [\phi_1, \phi_2, \ldots, \phi_N]$ = rearrangement (F) by at a first step k=1, denoting a first column of the $\Psi$ matrix, $\phi_1 \equiv f_t^{(1)}$, selected from $f_i^{(1)}$ where $$\|f_t^{(1)}\|^2 = \max\{\|f_i^{(1)}\|^2\big|_{i=1}^N\}$$

and the first orthogonal basis is $$h_i = \sum_{i=1}^N \frac{\langle f_t^{(1)}, f_i^{(1)} \rangle}{\|f_t^{(1)}\|^2} f_t^{(1)};$$

(iv) building an orthogonal basis matrix H by at a kth step, where $k \geq 2$, calculate $f_i^{(k)}$ and $h_k$ as $$f_i^{(k)} = f_i^{(k-1)} \frac{\langle f_i^{(k-1)}, f_t^{(k-1)} \rangle}{\|f_t^{(k-1)}\|^2} f_t^{(k-1)},$$

$$h_k = \sum_{i=1}^N \frac{\langle f_t^{(k)}, f_i^{(k)} \rangle}{\|f_t^{(k)}\|^2} f_t^{(k)},$$

such that $h_k$ can be simplified as $$h_k = \sum_{m=1}^N \frac{\left\langle \left( \varphi_k - \sum_{i=1}^{k-1} \frac{\langle \varphi_k, \varphi_i \rangle}{\|\varphi_i\|^2} \varphi_i \right), \varphi_m \right\rangle}{\left\| \varphi_k - \sum_{i=1}^{k-1} \frac{\langle \varphi_k, \varphi_i \rangle}{\|\varphi_i\|^2} \varphi_i \right\|^2} \left( \varphi_k - \sum_{i=1}^{k-1} \frac{\langle \varphi_k, \varphi_i \rangle}{\|\varphi_i\|^2} \varphi_i \right), \text{ where}$$

$$\varphi_k = f_t^{(k)};$$

(v) initializing by letting $H_{subset} = \phi$, where $\phi$ is an empty set and let k=1;

(vi) finding $h_i$ such that $$\max_i \left\{ \frac{(y^T h_i)^2}{\lambda + (h_i)^T h_i} \right\}; \text{ and,}$$

(vii) including $h_i$ as an element of the $H_{subset}$ such that $$H_{subset} = H_{subset} \cup h_i;$$

(viii) regularizing by modifying the generalized cross validation variable $\lambda$ by letting the index of selected $f_t^{(k)}$ in the original F matrix be j, where $$\|f_t^{(k)}\|^2 = \max\{\|f_i^{(k)}\|^2\big|_{i=1}^N\},$$

such that $\phi_k = f_j^{(1)}$; and, (ix) stopping if $\|f_t^{(k)}\|^2 \leq \epsilon$, where $\epsilon$ is a preselected minimum value, otherwise letting k=k+1 and repeating beginning at step (e); and, (c) using the determined function approximation to choose process parameters for obtaining preselected physical results from the physical process.

* * * * *